US005896561A

United States Patent [19]

Schrader et al.

[11] Patent Number: 5,896,561
[45] Date of Patent: Apr. 20, 1999

[54] COMMUNICATION NETWORK HAVING A DORMANT POLLING PROTOCOL

[75] Inventors: Steven B. Schrader; Ronald L. Mahany, both of Cedar Rapids, Iowa

[73] Assignee: Intermec IP Corp., Beverly Hills, Calif.

[21] Appl. No.: 08/773,477

[22] Filed: Dec. 23, 1996

Related U.S. Application Data

[63] Continuation of application No. 08/448,769, May 24, 1995, abandoned, which is a continuation of application No. 08/119,278, Sep. 9, 1993, abandoned, which is a continuation-in-part of application No. 07/864,300, Apr. 6, 1992, abandoned.

[51] Int. Cl.$^6$ ................................................. H04B 17/00
[52] U.S. Cl. ............................ 455/67.1; 455/66; 455/517; 370/445; 370/449; 370/545
[58] Field of Search .................................. 455/32.1, 507, 455/517, 526, 62, 63, 66, 67.1, 67.3, 67.4, 343; 370/445, 446, 447, 448, 449, 450, 457, 437, 545

[56] References Cited

U.S. PATENT DOCUMENTS

| 4,071,908 | 1/1978 | Brophy et al. | 364/900 |
| 4,503,533 | 3/1985 | Tobagi et al. | 370/85.3 |
| 4,654,656 | 3/1987 | Deaver et al. | 370/95.2 |
| 4,736,371 | 4/1988 | Tejima et al. | 370/95 |
| 4,987,571 | 1/1991 | Haymond et al. | 370/85 |
| 5,012,469 | 4/1991 | Sardana | 370/95.3 |
| 5,042,083 | 8/1991 | Ichikawa | 455/33 |
| 5,070,553 | 12/1991 | Mahany et al. | 455/67.4 |
| 5,123,029 | 6/1992 | Bantz et al. | 375/1 |
| 5,274,841 | 12/1993 | Natarajan et al. | 455/66 |
| 5,355,375 | 10/1994 | Christensen | 370/446 |

FOREIGN PATENT DOCUMENTS

WO 91/16775  10/1991  WIPO .

Primary Examiner—Thanh Congle
Attorney, Agent, or Firm—Akin, Gumo, Strauss, Haver & Feld, LLP

[57] ABSTRACT

A base station utilizing a dormant polling protocol transmits polling sequences to a plurality of remote transceivers during periods of heavy loading. During periods of light loading, the base station stops polling and enters into a dormant state, listening for communication request from the remote transceivers. Upon receiving such a request, the base station immediately responds by servicing the requesting remote transceiver. In this way, the base station provides optimized utilization of the communication channel during periods of heavy and light loading conditions. The features of the dormant polling protocol may incorporate any polling protocol such as those described herein.

14 Claims, 18 Drawing Sheets

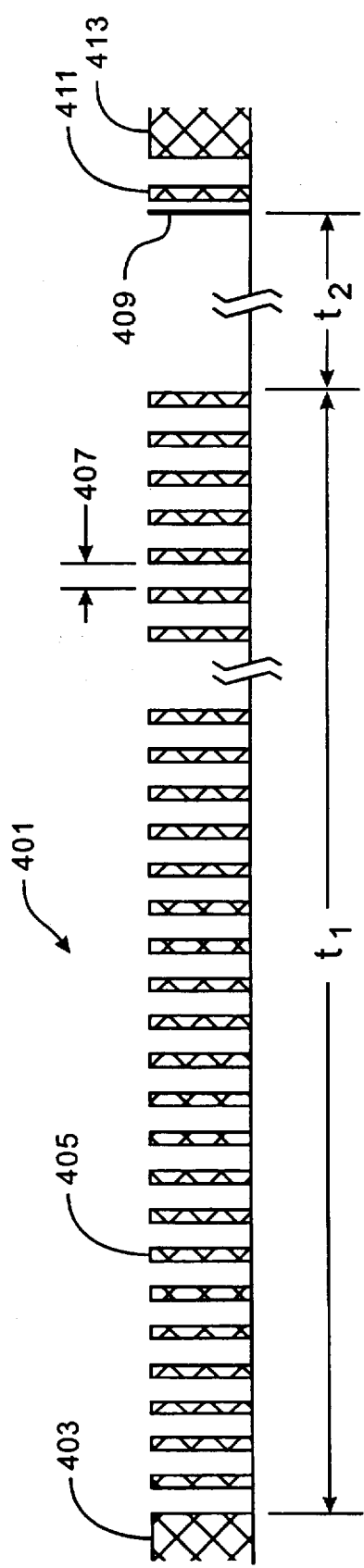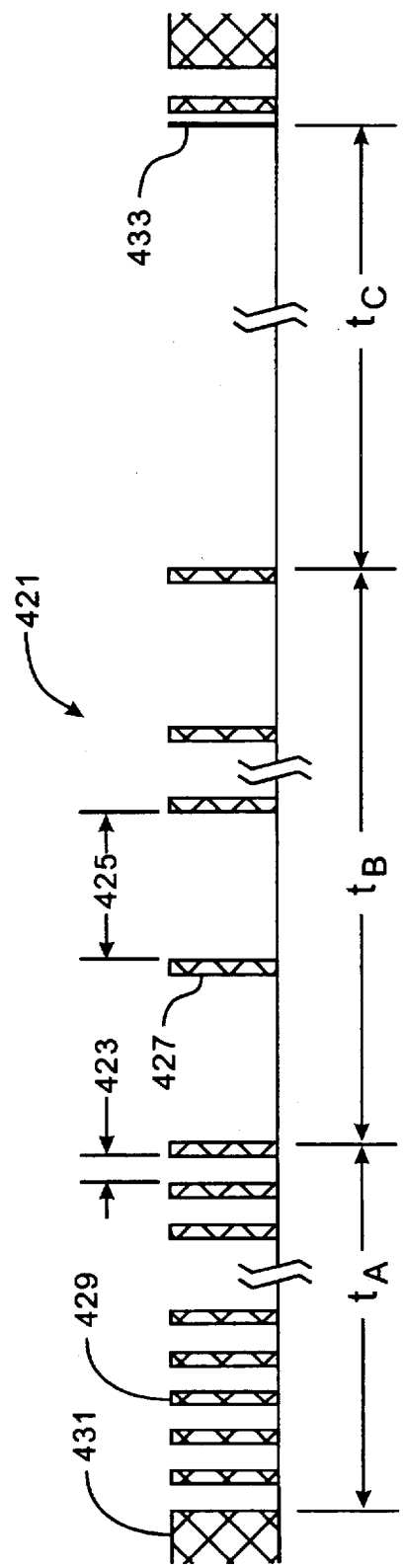
Fig.1B
Fig.1C

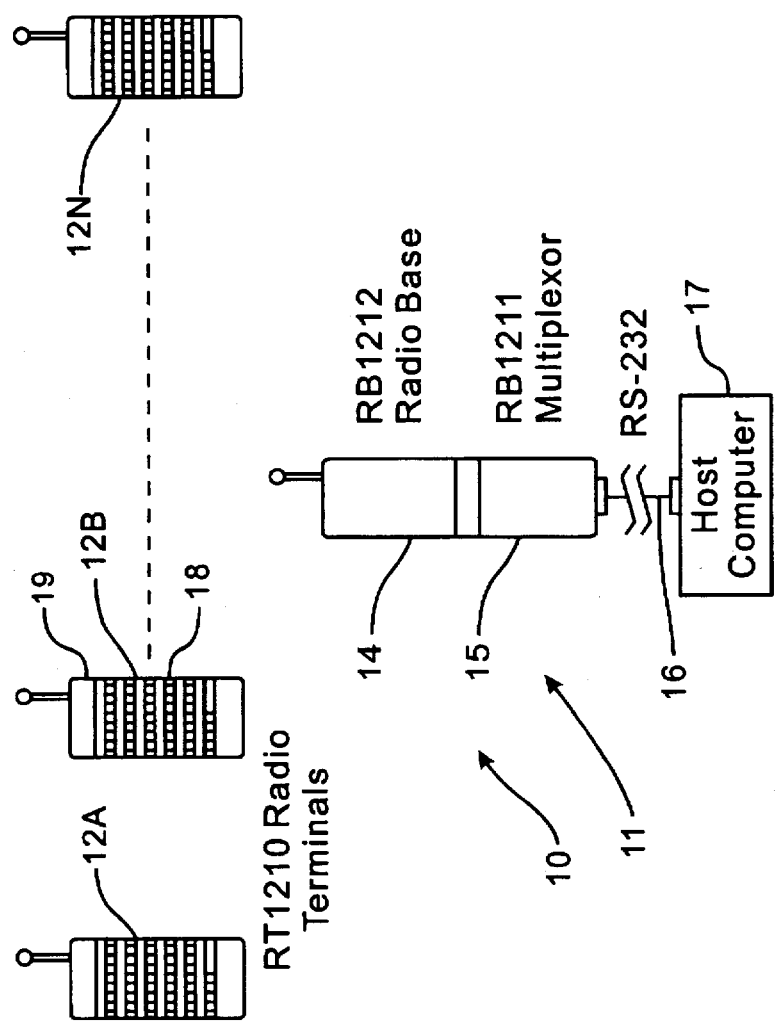

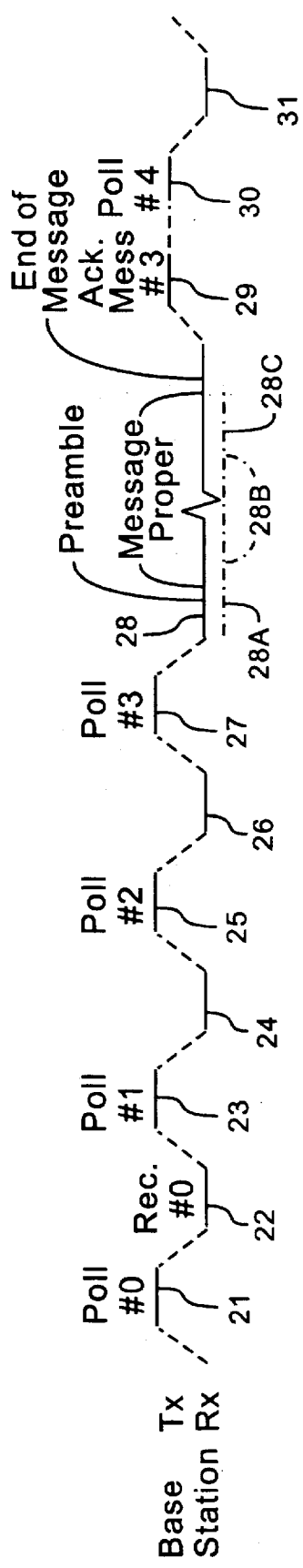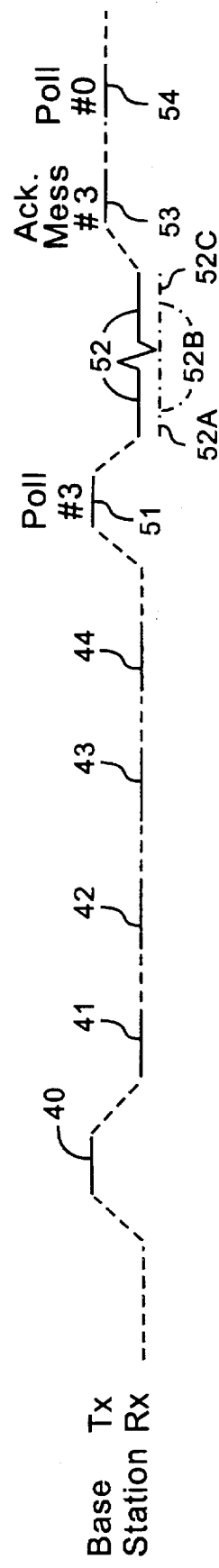

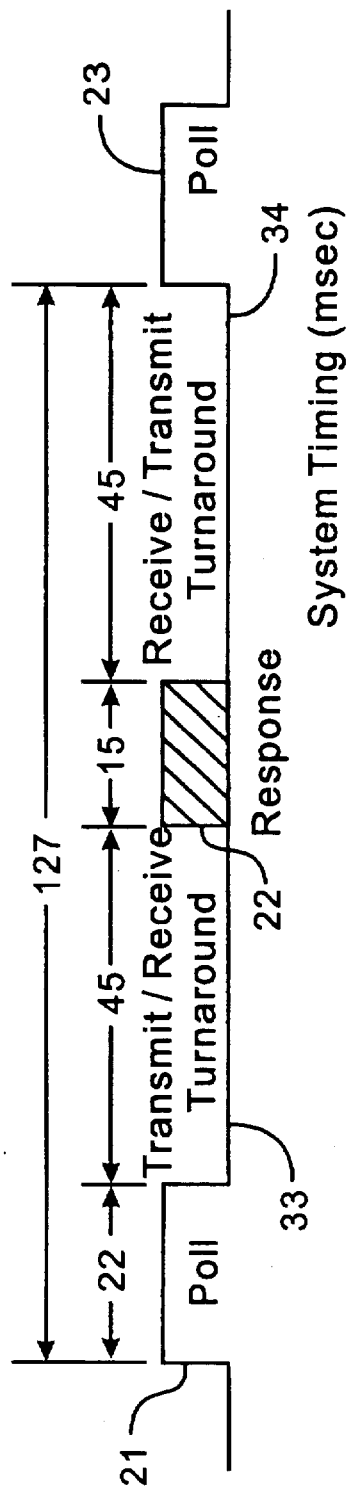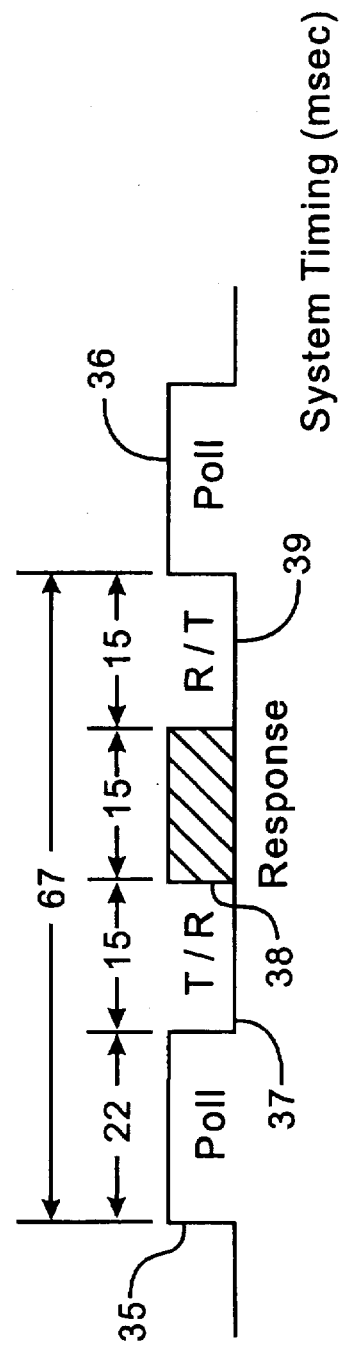

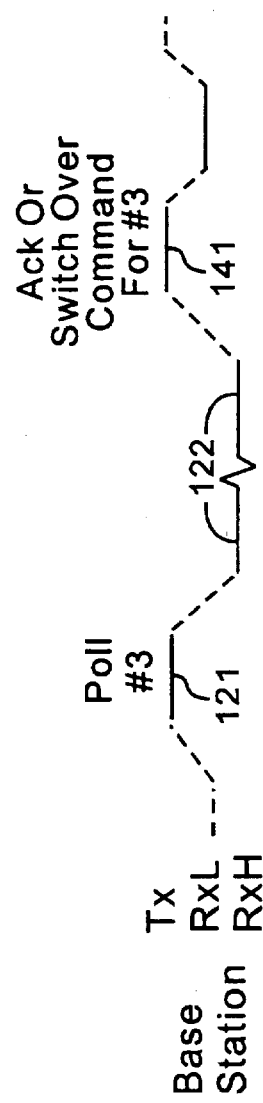
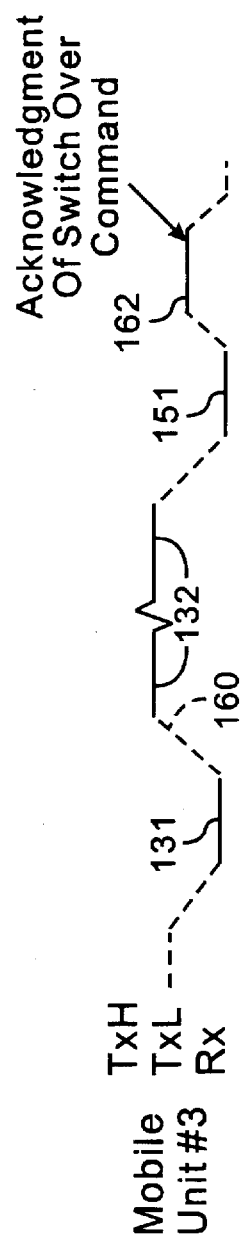

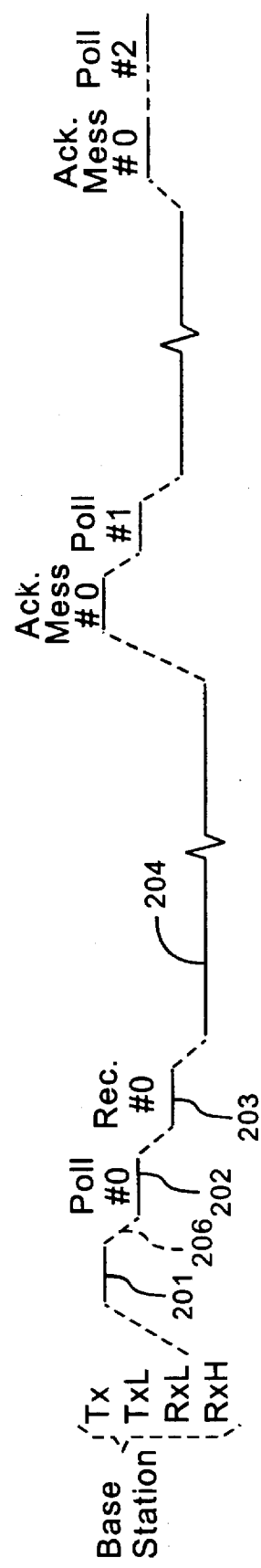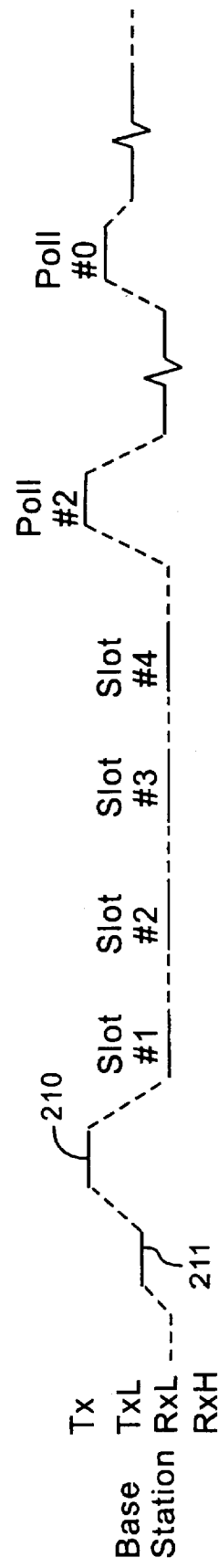

COMMUNICATION NETWORK HAVING AN DORMANT POLLING PROTOCOL

CROSS-REFERENCE TO RELATED APPLICATIONS

This application is a continuation of U.S. patent application Ser. No. 08/448,769 filed May 24, 1995, abandoned, which is a continuation of U.S. patent application Ser. No. 08/119,278 filed Sep. 9, 1993, now abandoned. Application Ser. No. 08/119,278 is itself a continuation-in-part of U.S. patent application Ser. No. 07/864,300 filed Apr. 6, 1993, now abandoned, and also claims priority to PCT Application Ser. No. PCT/US93/03152 filed Apr. 6, 1993.

BACKGROUND OF THE INVENTION

The present invention relates to improvements in radio data communication systems which utilize a polling protocol, originating from a base station, to schedule and maintain communication with a number of remote transceiver units. More particularly, the present invention relates to a dormant polling protocol which schedules all communication on a heavily loaded communication channel, while permitting unscheduled communication whenever the communication channel is lightly loaded.

To establish communication, polling protocols require a base station to repeatedly poll each of the remote transceiver units being serviced. Even during periods when no communication is taking place, the base stations must still continue to poll, awaiting a response. This unproductive polling not only wastes the base station's energy (important when the base station is battery powered), but also unnecessarily dominates a communication channel so as to interfere with other communication on or near that channel.

In addition, polling protocols are most effective under conditions of heavy channel communication—where effectiveness is a measure of response time. During periods of light channel communication, a CSMA (carrier-sense multiple-access) type protocol which is initiated by the remote transceivers prove more effective than a polling protocol. However, neither of these types of communication protocols prove most effective under both heavy and light communication loading.

Accordingly, it is an important object of the invention to provide a dormant polling protocol that effectively operates during periods from heavily to lightly loaded conditions.

Another object of the invention is to provide a radio data communication system utilizing a dormant polling protocol to efficiently conserve transmission energy.

A further object of the invention is to provide a radio data communication system having a dormant polling protocol that only utilizes a communication channel when necessary.

A further object of the invention is to provide a radio data communication system which switches between one type of communication protocol to another in response to channel loading characteristics.

Another object of the invention is to provide a radio data communication system which automatically chooses between a polling protocol and a remote initiated protocol to optimize channel efficiency.

Another object of the invention is to provide a radio data communication system that manages communication on a communication channel using a first protocol during periods of higher channel loading and a second protocol during periods of lower channel loading.

Other objects, features and advantages of the present invention will be apparent from the following detailed description taken in connection with the accompanying drawings, and from the respective features of the appended claims taken individually and in cooperative combinations.

SUMMARY OF THE INVENTION

The present invention includes a method of optimizing communication exchanges in a radio frequency data communication network having a remote terminal and a base station. In particular, the method comprises several steps. First, an active state associated with a first protocol which permits the base station to control initiation of communication exchanges in the network is provided. Similarly, the network provides a dormant state associated with a second protocol which permits the remote terminal to initiate communication exchanges in the communication network. The conditions of the communication channel are evaluated and either the dormant or active state is selected so as to optimize the response time on the communication network.

Additionally, in accordance with the present invention, a method is disclosed which is used by a base station to optimize communication on a communication channel with a plurality of remote transceivers. Specifically, at a first step, if the level of activity on the communication channel is determined to be greater than a transition threshold, the base station transmits a polling sequence, services each responding remote transceiver, and repeating this step. At a second step, if the level of activity on the communication channel is less than the transition threshold, the base station awaits a communication request from any of the plurality of remote transceiver. Upon receiving a communication request, the base station services the requesting remote transceiver, and branching to the first step.

Additionally, in accordance with the present invention, a method used by a base station a radio frequency data communication system to optimize communication on a communication channel with a plurality of remote transceivers is disclosed. More particularly, this method includes the steps of transmitting a polling sequence, servicing each responding remote transceiver, and repeating this step if the level of activity on the communication channel is determined to be greater than a transition threshold. Thereafter, the base station starts to time a period of low-activity. Next, the base station transmits a polling sequence, services each responding remote transceiver, and if both the level of activity on the communication channel is determined to be less than the transition threshold and the period of low-activity has not reached a threshold period, the base station adjusts the polling rate based on the period of low-activity and repeating this step. If the level of activity is greater than the transition threshold, the base station resets the timing of the period of low-activity, resets the polling rate, and branches to the first step. If, however, the level of activity is less than the transition threshold and the period of low-activity has reached the predetermined threshold period, the base station enters a dormant state awaiting a communication request from the remote transceivers.

BRIEF DESCRIPTION OF THE DRAWINGS

FIG. 1B is an illustration of a time-line representing a modified version of the dormant polling protocol described in relation to FIG. 1A;

FIG. 1C is an illustration of a time-line representing a further modified version of the dormant polling protocol of the present invention described in FIGS. 1A and 1B;

FIG. 2A is a diagrammatic illustration of an existing radio data system which may be upgraded to incorporate features of the present invention;

FIG. 2B is a diagrammatic illustration of the sequential polling procedure which is utilized with the system of FIG. 2A;

FIG. 3 is a diagram illustrating the system timing for the prior art system of FIGS. 2A and 2B;

FIG. 4 is a diagram similar to FIG. 3 illustrating system timing for a prior art system having nearly twice the polling speed of the system of FIGS. 2A–3;

FIG. 5 is a diagram similar to FIG. 2B but illustrating a second protocol which is utilized in a recently introduced product family having a high performance mobile terminal unit representing the next generation in comparison to the system represented in FIG. 4;

FIGS. 7A and 7B illustrate an implementation of the embodiment of FIG. 6 where the receiver of each mobile unit may operate at a standard data rate, FIGS. 7A and 7B being shown to the same time scale, and utilizing respective levels to represent transmission and reception at a standard rate compatible with the earlier versions of the system and at a higher data rate for increased system throughput, FIG. 7A representing successive switching modes at the base station, and FIG. 7B illustrating the corresponding switching modes of an exemplary mobile unit in radio communication with the base station;

FIG. 10 is a plot similar to that of FIG. 2B, but illustrating operation of the system of FIG. 6 where the base station sends a high data rate test pattern to all of the mobile units simultaneously, for example in advance of a sequential polling cycle;

FIG. 11 is a plot similar to that of FIG. 5, but showing the base station of FIG. 6 transmitting a high data rate test pattern for example immediately following a standard data rate general poll for the example of a contention polling protocol;

FIG. 14 showing the specific example of N equals four and M equals one; FIG. 15 showing alternating high data rate and low data rate communication frames where N and M may both vary (generally in opposite senses) in successive cycles; and FIG. 16 showing a case where plural communication frames of one type (e.g. 9600 baud) occur between a lesser number (e.g. one) of the other type of communication frame, this pattern being repeated, or varied as a function of loading at the respective data rates.

DETAILED DESCRIPTION OF THE INVENTION

Figure 1A:
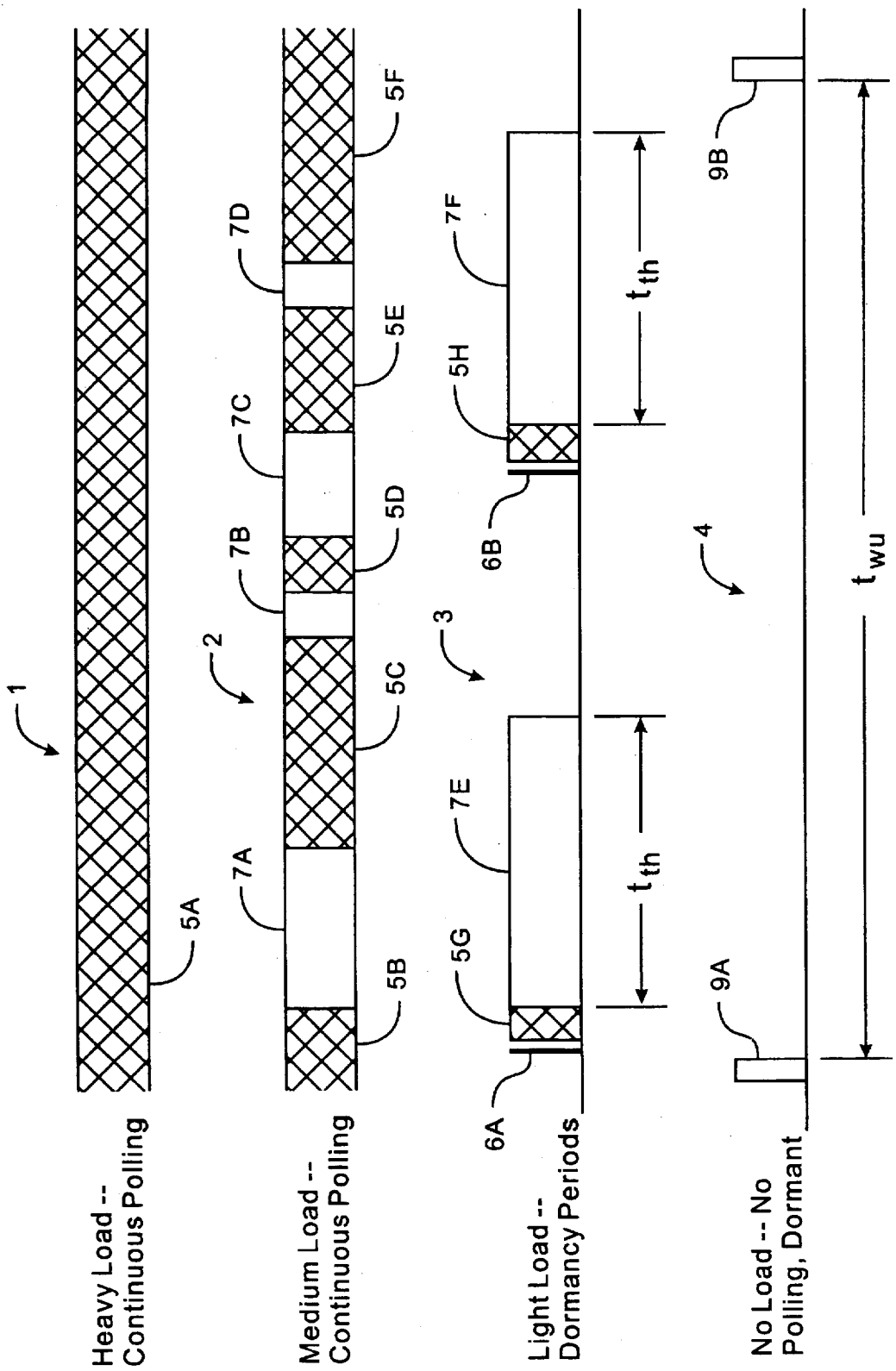
FIG. 1A is an illustration of a dormant polling protocol of the present invention.

FIGS. 1A–1C are various illustrations of a dormant polling protocol of the present invention. The dormant polling protocol may be used with any communication network, such as the network described below in reference to FIG. 2A. Basically, the communication network consists of a plurality of remote transceivers 12 and base station transceivers, such as a base station 14, which occasionally find it desirable to engage in a communication exchange (FIG. 2A). Although a variety of communication protocols may be used to manage the communication exchanges, each communication protocol has particular advantages and disadvantages. In the present invention, the communication network adapts to the channel conditions by choosing the communication protocol most appropriate for the channel conditions, thus optimizing communication flow in the network.

Specifically, during periods of little or no loading on the communication channel, the best protocol for managing a communication exchange would be one that can be freely initiated from any transceiver in the network desiring to communicate. As used herein, the term "loading" refers to the density of communication exchanges occurring on the communication channel. An exemplary protocol for use during such periods of light loading would be a carrier sense, multiple access (CSMA) protocol. The CSMA protocol exhibits the advantages of: 1) permitting rapid access to the communication channel; 2) maintaining a clear communication channel when not in use; and 3) saving energy by not requiring unnecessary transmissions. The inherent disadvantages of the CSMA protocol includes the susceptibility to transmission collisions between any two or more transceivers resulting from: 1) simultaneous transmission initiation upon detecting a clear channel enhanced by propagation delays; and 2) two source transceivers, out of range of each other yet each in range of the destination, beginning transmissions while incapable of sensing an ongoing transmission carrier to the destination which is out of range.

During periods of light channel loading, the disadvantages of the CSMA protocol have little overall effect on the network's average response time. As the channel loading increases, however, the average response time degrades significantly.

During periods of heavier communication channel loading, a better protocol for managing a communication exchange would be one that controls the initiation of exchanges on the network. A polling protocol, for example, provides such control. A polling protocol exhibits the primary advantage of decreasing the number of collisions on the network by scheduling communication exchanges. The polling protocol's primary disadvantage centers on the additional overhead associated with the scheduling of the exchanges. Whether or not any communication on the network is desired, the scheduling of communication, i.e., via polling transmissions, must occur, often wasting energy and making the channel unnecessarily busy. Additionally, transceivers desiring to communicate must wait for appropriate scheduling before an exchange can take place. The nearly instant channel access, as may be found with a CSMA type protocol, is not possible.

The inherent disadvantages of the polling protocol resulting from scheduling overhead is justifiable under heavier channel loading conditions. The number of collisions are reduced and the average channel response time is optimized. At some point however, as the channel loading decreases, the associated overhead cannot be justified.

In addition, various other protocols, such as those described in more detail below, exhibit similar advantages and disadvantages as found in polling or CSMA type protocols. Such protocols might offer optimum channel performance under certain other channel conditions.

The communication network of the present invention selects, from a plurality of protocols, a protocol which provides optimal response time under given channel conditions. As channel conditions change, the network exchanges the selected protocol with another of the plurality whenever a more optimal communication channel can be established.

Specifically, in one embodiment of the present invention, under heavy loading conditions, the network utilizes base stations, such as a base station 14 (FIG. 2A), to optimize the communication channel by entering an "active" state. While in the active state, the base station 14 controls the communication channel using a polling protocol, scheduling each communication exchanges between the base station 14 and the remote terminals 12. Other base station controlled protocols might also be used.

The overhead associated with the polling protocol during periods of heavy loading is outweighed by the reduction in the number of collisions that would otherwise occur on an uncontrolled communication channel. At some point, however, as channel loading decreases, the associated overhead cannot be justified. Under such conditions, instead of polling, the base station 14 enters a dormant state, where it listens for transmissions from the remote terminals 12 without polling. Particularly, while in the dormant state, the base station turns over the control of the channel to the remote terminals 12 which initiate communication using a carrier-sense, multiple-access (CSMA) protocol. Other remote transceiver initiated protocols might also be used.

The base station makes the transition between the active and dormant states by monitoring the current channel conditions. For example, when the current level of channel loading rises above a predetermined transition threshold, the base station enters the active "polling" state. When the current loading level falls below the transition threshold, the base station enters the dormant "listening" state.

Additionally, instead of continuing to use a fixed transition threshold, the communication network might also adapt the threshold based on feedback from actual protocol performance under given channel conditions. For example, if the current transition threshold recommends a transition to an alternate protocol which proves to have inferior channel response time, the threshold could be adapted to prevent the transition under the current channel conditions.

To prevent protocol jitter near the threshold, i.e., to prevent repeated toggling between two similarly performing protocols at the threshold channel conditions, an imposed duration for evaluating the efficiency of the channel is required before permitting a protocol transition. In one embodiment, the network compares the transition threshold against a weighted average of the most current channel characteristics so as to filter occasional spikes in the channel characteristics. Other types of threshold averaging comparisons to prevent jitter are also contemplated by the present invention.

The base station may also transition between the active and dormant states using a more gradual approach by selecting from a variety of communication protocols. For example, the base station may transition from a continuous polling state to a series of successively slower periodic polling states before reaching the dormant state. FIGS. 1A–1C provide further detailed examples of such possible transitions. Moreover, the base station may only transition between the different active protocol states to optimize the channel, never considering operation in the dormant state.

Referring to FIG. 1A, time-lines 1, 2, 3 and 4 represent the activity of a communication channel under heavy, medium, light and no load conditions. In the time-lines 1–3, periods in which at least one of the remote terminals respond to each polling sequence broadcast by the base station are represented by communication exchange intervals 5A, 5B, 5C, 5D, 5E, 5F, 5G and 5H. Periods in which the base station receives no response to any transmitted polling sequence are represented by non-responsive polling intervals 7A, 7B, 7C, 7D, 7E and 7F.

During periods of heavy loading, as illustrated in the time-line 1, the remote transceivers respond to each polling sequence broadcast by the base station as represented by the long duration of the communication exchange interval 5A. Because of the density of the communication exchanges, the selection of a polling protocol yields optimal channel performance. Similarly, during periods of medium loading, intervals occasionally occur in which the remote transceivers do not respond to polling sequences from the base stations as illustrated by the non-responsive polling intervals 7A, 7B, 7C and 7D. Even so, polling during such loading periods may still offer the optimal channel solution.

During periods of light loading as illustrated in the time-line 3, the remote transceivers only occasionally find it necessary to communicate with the base station. Because of the unjustifiable overhead associated with a polling protocol during periods of light loading, the base station enters a dormant state, turning control of the channel over to the remote transceivers. The remote transceivers respond to the lack of polling by initiating communication using a CSMA type approach, providing better channel optimization. Thus, as the load on the communication channel fluctuates, the base station transitions between the active and dormant states as necessary to optimize the channel.

In addition, while in the dormant state, the base station immediately responds to a communication request 6A by transitioning into the active state and polls the requesting remote terminal in the communication exchange interval 5G. Afterwards, the base station remains in the active state, polling for further communication. If no response to the polling is received before a predetermined threshold period $t_{th}$ expires, the base station will transition back into the dormant state. This transition after the period $t_{th}$ expires is represented by the non-responsive polling interval 7E. At some time thereafter, when a communication request 6B is received from one of the remote transceivers, the base station again transitions from the dormant state back to the active state to service the request in the communication exchange interval 5H, and the transition cycle repeats.

Although set at one (1) minute, the predetermined threshold period $t_{th}$ may be set at any time period which optimizes the dormant polling protocol in the given communication environment. Optimization of the predetermined threshold period $t_{th}$ must take into consideration not only communication throughput factors but also the independent value of having a dormant or quiet communication channel.

As illustrated in the time-line 3, after servicing the requesting remote terminal in a communication exchange, the base station remains in the active state, polling for further communication. Instead of remaining in the active state, however, the base station may also immediately reenter the dormant listening state after servicing the requesting remote transceiver. If so, the base station might only make a full transition back to the active mode upon detecting a heavily loaded channel.

More specifically, the base station remains in the dormant state indefinitely until one of the remote transceivers initiates a communication request. The base station responds by immediately polling the requesting remote transceiver. Because the requesting remote transceiver does not have to wait for the scheduling associated with a full polling sequence, the response time increases dramatically. Instead of responding immediately, the base station might also choose to respond indirectly by servicing the requesting remote transceiver using a full polling sequence. Furthermore, although not preferred, the requesting terminal might also send a message or data along with the communication request 6A. Because polling would be unnecessary, the base station might only send an acknowledge signal in response. After responding, the base station would remain in the dormant state until the number of such requests per unit time increased above the transition threshold.

As illustrated in the time-line 2, if a period of non-responsive polling fails to reach a transition threshold period $t_{th}$, the base station will not enter the dormant state. Instead, the timing of the non-responsive polling period is reset. This process is illustrated in the time-line 2 with reference to the non-responsive polling intervals 7A–7D which never reach the threshold period $t_{th}$.

In another embodiment, once in the dormant state, the base station remains in the dormant state until one of the remote transceivers initiates communication. Additional circumstances may also cause the base station to enter the active state. Particularly, the base station may exit the dormant state when either data needs to be communicated to the remote transceivers or after a predetermined wake-up period $t_{wu}$ lapses. For example, as illustrated in the time-line 4, at the lapse of the period $t_{wu}$, a polling interval 9A or 9B might occur. The use of polling periods after the lapse of the predetermined wake-up period $t_{wu}$ may also provide each of the remote transceivers with an indication of those base stations, if more than one, which are in range or an indication that a message is waiting and communication is desired.

Periods of non-responsive polling, such as the interval 7A, may consist of either continuous or periodic polling. Continuous polling is defined herein as a repeated broadcast of a complete polling sequence having no delays between each repeated sequence. Periodic polling is polling which repeatedly broadcasts the complete polling sequence with a delay period between broadcasts. Moreover, continuous polling is merely a subcategory of periodic polling. If the periodicity of the periodic polling is such that the delay period between broadcast is zero (0), the periodic polling can be further classified as being continuous polling.

In another embodiment, instead of transitioning to a CSMA type protocol during periods of light loading, the base station may transition from continuous polling to periodic polling, or from periodic polling at a higher rate to a periodic polling at a lower rate. For example, during periods of heavy loading, the continuous polling protocol might offer an optimal channel response time. By continuous polling, the base station would be in an active state.

At some point as the loading decreases, the overhead associated with the continuous polling might not be justified in view of the wasted energy and the unnecessarily busy channel associated with polling transmissions that yield little or no response. Instead, a dormant state using a period polling protocol may be desirable. Specifically, upon detecting a time period greater than a threshold value of about thirty (30) seconds wherein no responses to polling occur, the base station transitions to a dormant state using a periodic polling protocol having a periodicity of about two (2) seconds. Although the specified time values for the threshold time period and for the periodicity provide a preferred default, they are both user selectable upon network set up.

During the dormant state defined by the periodic polling protocol usage, the remote terminals must await a polling signal before they can respond. Once the response is detected while periodically polling, the base station immediately returns to the active state using the continuous polling protocol, and the cycle continues. Other variations are also contemplated. For example, instead of immediately transitioning to the active state, the base station may remain in the periodic polling state until sufficient loading is detected using the periodic polling. Similarly, instead of requiring that the remote terminals wait for the periodic poll, they may send a polling request using the CSMA type approach.

FIG. 1B is a more detailed illustration of the dormant polling protocol described in relation to FIG. 1A using periodic polling. Specifically, in a time-line 401, a periodic polling interval $t_1$ begins after completing a communication exchange 403 between the base station and one of the remote transceivers. Each polling sequence, such as a sequence 405, which occurs during the polling interval $t_1$ is separated from the preceding and subsequent polling sequences by a predetermined delay period, such as a delay period 407. The delay period 407 may be set to at about 250 milliseconds (ms) or whatever other value is optimal depending on the characteristics of the communication channel.

During the predetermined delay periods, the remote transceivers may believe that the base station has transitioned into the dormant state and may initiate communication. However, to avoid potential collisions, the remote transceivers may be required to wait a random period of time, such as about two (2) seconds, before transmitting. To prevent the remote transceivers from transmitting during delay periods, the remote transceivers might be forced to wait a fixed period of time which is equal to or greater than the predetermined delay period before initiating communications. Such a requirement would not prevent the initiation of communication during the dormant state.

As previously described, the transition threshold period $t_{th}$ defines the duration of the periodic polling interval $t_1$. If no remote transceivers respond for the transition threshold period $t_{th}$, the interval $t_1$ ends and the base station enters a dormant state as represented by a dormancy interval $t_2$. The base station remains in the dormant state until one of the remote transceivers sends a communication request 409. The base station may indirectly respond to the request 409 as illustrated by providing a full polling sequence 411 for scheduling a communication exchange 413. However, the base station may also directly respond without the polling sequence 411 by immediately entering the communication exchange 413. Finally, upon termination of the communication exchange 413, the base station may either reenter the dormant state or reenter the periodic polling interval $t_1$.

The basis for transitioning between states as shown in FIG. 1B occurs when the duration of a non-responsive polling interval reaches the threshold period $t_{th}$. As an alternative however, the transitioning may be based on a duration of low-activity. Specifically, if the level of communication exchange activity during the interval $t_1$ falls and remains below a predetermined lowactivity level for the threshold period $t_{th}$, the dormant state represented by the interval $t_2$ would be entered. After servicing the requesting remote transceiver in the communication exchange 413, the base station could either: 1) remain in the dormant state unless the average activity level of the channel rises above the low-activity level wherein the active state would be reentered; or 2) immediately reenter the active state.

FIG. 1C is an illustration of a modified version of the dormant polling protocol described in FIGS. 1A and 1B which illustrates the use of a variable delay period between polling sequences. As shown in FIG. 1B, the delay period between each polling sequence such as the delay period 407 is set to a single, fixed duration. In FIG. 1C, however, the base station may transition from a faster active state to a slower active state before transitioning into the dormant state. The faster active state has a faster polling rate than the slower active state. This rate is governed by the delay period between each polling sequence.

Particularly, during a time interval $t_A$, after servicing one of the remote transceivers as represented by a communication exchange 431, the base station periodically polls at a fast polling rate based on a short delay period 423 between polling sequences. The base station continues polling at the fast polling rate until a non-responsive polling interval occurs which reaches a fast threshold period $t_{Fth}$. The fast threshold period $t_{Fth}$ may be about thirty (30) seconds long.

After a non-responsive polling interval reaches the fast threshold period $t_{Fth}$, the base station begins to poll at a slower rate defined by a long delay period 425. This slower polling rate may be at about once every second, or may be at any other rate optimal for the specific communication system at issue. During a time interval $t_B$, the base station continues to poll at this slower rate until either: 1) a non-responsive polling interval occurs which reaches a slow threshold period $t_{Sth}$, and the dormant state defined by a dormant period $t_c$ is entered; or 2) a response is received from a remote transceiver, and the faster active state is reentered. The slow threshold period $t_{sth}$ may be about thirty (30) seconds. Finally, the base station remains in the dormant period $t_c$ until it receives a communication request 433.

Although the remote transceivers may initiate a communication request between each polling sequences, the remote transceivers may also be forced to wait and then specifically respond to a polling sequence. If so forced, the necessary waiting time would be the maximum delay period between periodic polling sequences. In FIG. 1C, this would be the long delay period 425.

Instead of basing the decision of transitioning between states upon a non-responsive polling interval, the decision might be based upon low channel activity. To accomplish this, the base station may maintain a history log of the recent activity of the channel. Based on an average or weighted average of the recent activity, the base station can determine when to transition between the fast active, slow active and dormant states.

In addition, although only two fixed polling rate transition states have been disclosed in FIG. 1C, a more gradual or continuous transition may also be employed. In this way, the polling rate would more closely track the activity level of the channel. Similarly, other protocol variances may also be utilized in transitioning between states. For example, a third type of protocol may be used as an intermediate transition state between the active "polling" state and the dormant "CSMA type" state.

The features of the dormant polling protocol described in relation to FIG. 1A–1C can be incorporated into any communication system which has at least one central "base station" and a multiplicity of "remote transceivers". Exemplary communication systems currently using various polling protocols which may incorporate the dormant polling features are set forth in detail below.

Figure 1D:
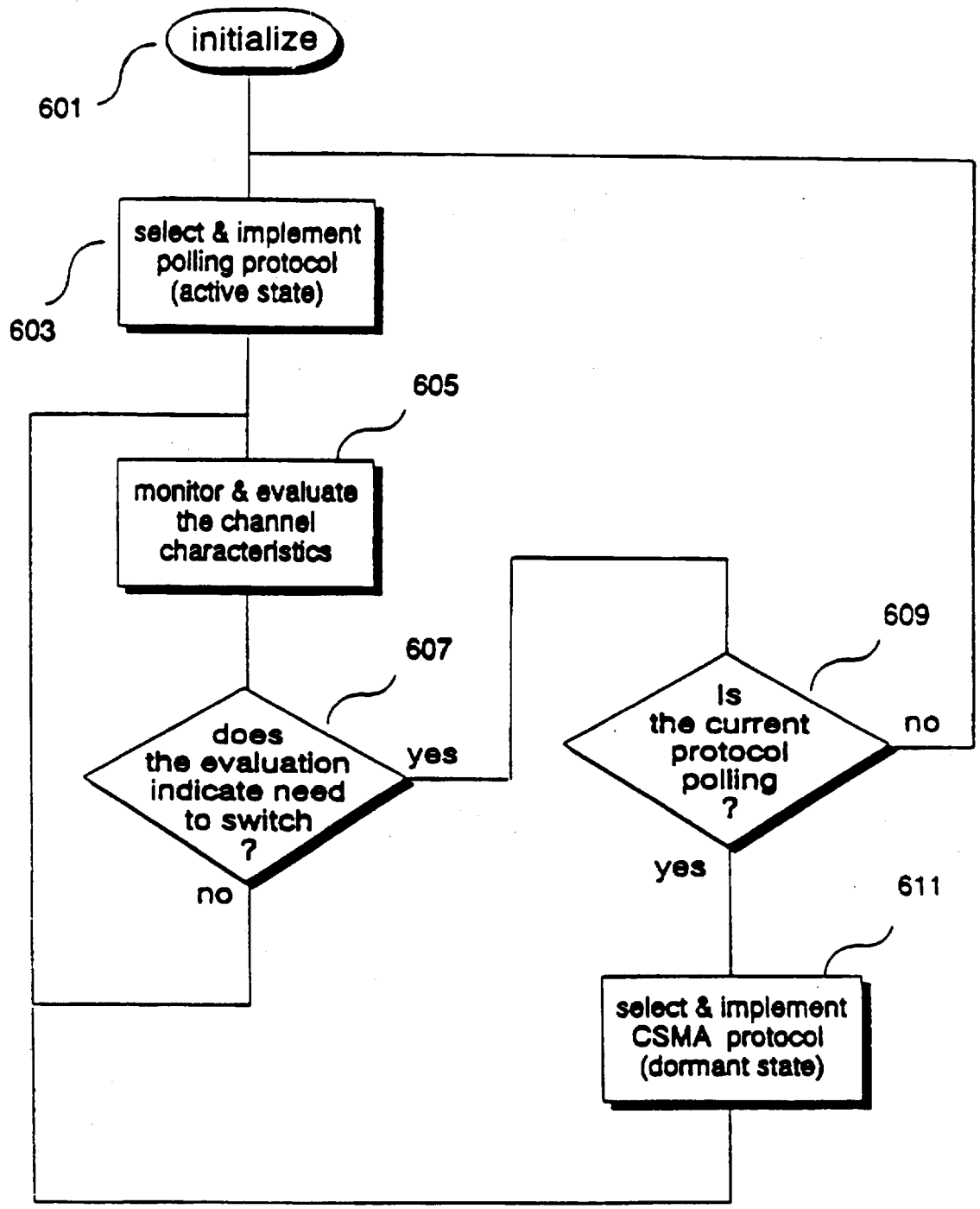
FIG. 1D is a software flow diagram illustrating the operation of a base station in the radio frequency communication network of the present invention.

FIG. 1D is a software flow diagram illustrating one embodiment of the operation of a base station in the radio frequency communication network of the present invention. Upon power-up, at a step 601, the base station initializes itself, and, in a block 603, selects and implements a polling protocol for use on the network. Thus, by choosing the polling protocol, the base station enters an active state.

At a step 605, the base station begins monitoring the channel characteristics, and evaluates whether the selected polling protocol currently in operation offers the best available solution for optimizing the communication channel. In this example, the only other available solution is the CSMA type protocol, however, various other protocols or protocol variations may also be available. The details of exemplary protocol variations are set forth below. Similarly, the details of both the channel characteristics monitored and the nature of the evaluation thereof have been previously set forth in the various embodiments described above in relation to FIGS. 1A–1C.

At a step 607, if the evaluation does not indicate that a different protocol would offer a better network solution, the base station branches back to repeat this cycle of steps 605 and 607 which continues until a different protocol is indicated at the step 607. As previously stated, the only other different protocol available in this exemplary flow-diagram is a CSMA type protocol, although others are contemplated.

If at the step 607 the evaluation does indicate that a different protocol, i.e., the CSMA type protocol, would offer a better network solution, the base station identifies the CSMA protocol at a step 609. Thereafter, the base station selects and implements the CSMA type protocol at a step 611 then re-enters and remains in the cycle of steps 605 and 607 until the evaluation indicates that the polling protocol offers a better solution at the step 607. By implementing the CSMA type protocol, the base station enters the dormant state.

If the evaluation at the step 605 indicates at the step 607 that polling would offer a better solution, the base station branches at the step 609 to the step 603 where it re-enters the active state by selecting and implementing the polling protocol. Thereafter, the entire process repeats.

FIG. 2A is an illustration of an existing radio frequency data transmission system 10 which might incorporate the dormant polling protocol. Particularly, a base, station transceiver 11 is in radio communication with a number of mobile transceiver units such as 12A, 12B, ..., 12N. By way of example, the base station may comprise a radio base unit 14 such as the model RB1212 of Norand Corporation, Cedar Rapids, Iowa, which forms part of a product family known as the RT1200 system. In this case, the radio base 14 may receive data from the respective mobile RF terminals, e.g. of type RT1210, and transmit the received data via a multiplexor 15, e.g. type RM1211, and a communication link 16 (e.g. utilizing an RS-232 format) to a host computer 17.

The data capture terminals 12A, 12B, ..., 12N may each be provided with a keyboard 18, a display 19, and a bar-code scanning capability, i.e., an instant bar-code reader such as the one shown in U.S. Pat. No. 4,570,057, issued Feb. 11, 1986, and known commercially as the 20/20 instant bar code reader of Norand Corporation.

The RT1200 system utilizes time-division multiplexing on a single-frequency channel (e.g. in the 450-megahertz band) to provide access to the respective terminals. The RT1200 communication protocol is based on a sequential polling method that transmits a query addressed to each portable terminal in succession, and allows a specified amount of time for the addressed terminal to respond in case a data message is ready for transmission.

A transmitted message consists of an initialization sequence, unit address, message identifier and system information, message data and/or control commands, error control, and end-of-message indication. The basic sequential polling procedure of a base station such as the RB1212 is illustrated in FIG. 2B where level TX represents transmit mode of the base station and level RX represents receive mode. In FIG. 2B, solid line 21 represents a transmit time interval where the base station transmits a polling signal for a mobile unit of a first address, e.g. #0, at a predetermined data rate e.g. 4800 baud. The base station then allows a specified amount of time represented as time interval 22 for the addressed terminal to respond if communication activity is required. The intervals at 23 and 24 apply to a second terminal address, e.g. #1, the intervals 25 and 26 apply to a third terminal address, e.g. #2, the time intervals 27 and 28 represent the operation of a fourth terminal, e.g. #3, and so on.

The sequential polling process is timed by the multiplexor 15, FIG. 2A, of the RT1200 system such that if a response is not received from the addressed mobile terminal within the allotted time such as indicated at 22, a poll is issued to the next terminal in the sequence, e.g. as indicated at 23. In the RT1200 system, if the designated mobile unit has some information to send to the host computer 17, that information is immediately transmitted to the host as the response, in which case the base station remains in reception mode. In effect, for the RT1200 system, any of the reception intervals 22, 24, 26, etc. will be extended to receive complete messages from the respective addressed terminals where such messages are ready to be sent in response to the respective polling transmissions 21, 23, 25, 27, etc. In FIG. 2B, it is assumed that mobile unit #3 is the first unit with a message to send. In this case, the base station, while in receive mode as indicated at 28, will actually receive a transmission from mobile unit #3 indicating that a message will follow. The base station in response to the transmission from mobile unit #3 (which is signified by a second line 28A in FIG. 2B) remains in receive mode for the duration of the message from unit #3. The message itself from unit #3 may occur over a time interval as represented by dot-dash line 28B, and may be followed by an end-of-message transmission from unit #3 as indicated by a second line at 28C. In response to the end-of-message signal at 28C, the base station switches to transmit mode and transmits an acknowledgement message as indicated at 29 to advise unit #3 that the message was properly received.

The base station then resumes polling, e.g. transmitting a polling signal at 30 addressed to a mobile unit #4 and switching to receive mode for an interval 31, and so on. In order to minimize channel capacity that is wasted polling inactive terminals, activity time-outs may be employed so that units that have not transmitted are dropped from the polling sequence and placed in a contention queue. The assumption would be that inactive units are either not being used at all or that the operator is busy at some other activity for significant amounts of time.

FIG. 3 illustrates standard system timing (in milliseconds) for the RT1200 system as represented in FIGS. 2A and 2B. As indicated, a polling sequence such as the one indicated at 21 and 22 in FIG. 2B may occupy an overall time interval of 127 milliseconds, with a poll interval corresponding to interval 21 in FIG. 2B requiring twenty-two milliseconds, a transmit/receive turnaround interval such as represented at 33 in FIG. 2B requiring forty-five milliseconds, and a receive interval such as indicated at 22 in FIG. 2B being allotted fifteen milliseconds.

The RT1200 system represented in FIGS. 2A–3 may be modified so as to incorporate the dormancy features of the dormant polling protocol of the present invention. Specifically, referring to FIG. 2B, if the time period since the last communication with any mobile unit reaches the threshold time period $t_{th}$, the base station may enter a dormant listening state, freeing the communication channel of non-responsive polling. Thereafter, the base station remains inactive until communication is requested by one of the mobile units. The base station can either respond by initiating the complete polling cycle described in FIG. 2B or may immediately respond to the requesting mobile unit as indicated at 28.

FIG. 4 illustrates the corresponding standard system timing (in milliseconds) for a second product family known as the RT2200 system of Norand Corporation which may also incorporate the dormant polling protocol features. In this case, a standard cycle corresponding to the intervals 21, 33, 22 and 34 in FIG. 3 requires a total of sixty-seven milliseconds, polling intervals such as 35 and 36 requiring twenty-two milliseconds, and intervals 37, 38 and 39 each requiring fifteen milliseconds. The shorter transmit to receive and receive to transmit times offered by the RT2200 system result in nearly twice the polling speed in comparison to the RT1200 system.

The modulation method and communication bit rates are identical in the two system families so that it is possible for the components of the RT1200 and RT2200 systems to be mixed subject to some limitations. For example, any mix of terminals or bases that includes an RT1211 multiplexor or an RT1212 base requires that the forty-five millisecond intervals such as 33 and 34 be included during communication involving these components. More particularly, if either the RT1212 base station or RT1211 multiplexor is used with a mixture of RT1210 and RT2210 terminals, all terminals must respond using the slower (45 ms) delay. If these units are replaced with both the RB2212 base and RM2216 multiplexor, the system has the capability of adjusting the delay to match the particular terminals in use. For example, if units #1, #5, and #7 are RT2210's, and units #2, #3, #4, and #6 are RT1210's, the former three will be polled using the 15-ms delay, and the latter four will be polled using the 45-ms delay.

In addition, high system clock rates are required in rf terminals to provide decoding of bar code scans at an acceptable rate. However, the high clock rates also cause the generation of digital noise in and around the rf terminals. This noise can get into the rf terminal and interfere with communication, causing a reduction in the effective communication range. This problem is solved by using a dual clock rate. The terminal is operated normally at a slow system clock rate to minimize the generation of digital noise, and is switched to a fast clock rate during bar code scanning to allow the data obtained from the bar code scan to be processed at a higher rate. This lets the rf data link coexist with the need for and the hardware support for bar code scan decoding.

Description of FIG. 5

The dormant polling protocol of the present invention might also be incorporated into a more recent commercial development. In the more recent development, a mobile terminal unit is to be utilized that includes a high-performance 16-bit microprocessor and a memory capacity that allows large and complex application programs to reside and be executed within the terminal. With the introduction of this terminal, two new radio protocols have been developed. Both protocols use the slotted reservation approach for obtaining system access. The major difference between them is that one utilizes asynchronous data transmission which is backwards compatible with the hardware in the 2210, whereas the other utilizes synchronous data transmission, which is more efficient, but which requires specific hardware utilized only in the new terminal. The same slotted reservation access and data rate selection schemes are to be used with both protocols. Implementation of the new protocol in the RT2210 terminals requires a change of read-only memory (ROM). Implementation in the new terminal consists of a downloaded program resident in nonvolatile random-access memory (RAM).

As shown in FIG. 5, a general poll message such as the one indicated at 40 is transmitted to all terminals in the system, and the terminals are allowed to respond in random "time slots" as indicated at 41–44 to tell the controller that the terminal wants to communicate. The example in FIG. 5 provides four time slots 41–44 in which the terminals may respond to the poll. In practice, the number of time slots is varied depending on the traffic load and other conditions. Each terminal may respond to the poll 40 in any of the desired time slots with its address and some positive acknowledgement. The particular time slot in which the terminal chooses to communicate is selected at random by the terminal. In the event that several terminals—potentially more than the number of time slots available—desire communications, a high probability may remain that at least one of the terminals will transmit its response in a time slot that is free of other responses. Under light loading conditions, it is likely that more than one slot will contain an intelligible response message, which further improves the efficiency of the polling procedure. An additional improvement in efficiency may be realized because of FM capture, which allows recovery of a relatively strong signal in the presence of a relatively weak interfering signal.

Referring to FIG. 5, it may be that a terminal unit with an address of #3 responded during the first time slot 41, and that a terminal unit #0 responded in time slot 43. Several terminal units may have responded simultaneously in time slot 42 such that none was identified by the base station. In such a case, the base station, after elapse of time intervals 41–44, may first transmit a polling signal 51 addressed to terminal unit #3, and then receive a message from unit #3 as indicated at 52. As in FIG. 2B, the message received at 52 may include a preamble indicated at 52A, a message proper 52B, and an end-of-message signal 52C. The base station may then transmit an acknowledgement message as represented at 53, and thereafter proceed during time interval 54 to poll the next terminal unit, e.g. #0, which successfully responded to the general poll at 40. The message from terminal unit #0 may include message components such as those described for message 52. After each successfully responding mobile terminal has been polled and its message has been received, the procedure may be repeated with a further general polling cycle as at 40–44.

Figure 5A:
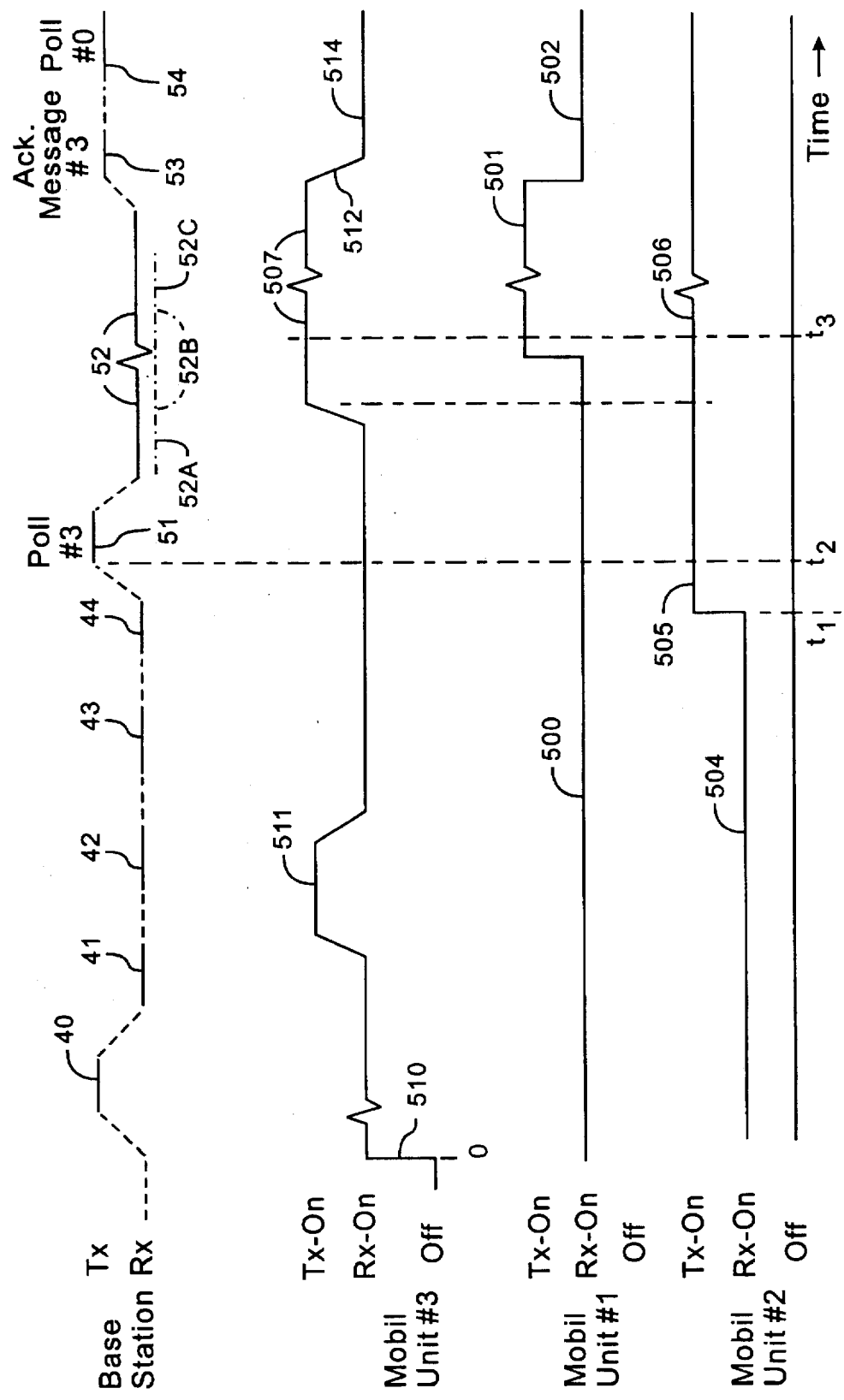
FIG. 5A is a modified version of FIG. 5.

In another embodiment, the features of the dormant polling protocol incorporate the protocol illustrated in FIG. 5A. Specifically, if the response to general polling cycles as illustrated at 40–44 falls below a transition threshold level for a time period equal to the threshold time period $t_{th}$, the base station enters a dormant listening state. The base station remains in the dormant state until communication is requested by one of the mobile units. The base station can either respond by initiating the complete polling cycle described at 40–44 or may immediately respond with a specific poll to the requesting mobile unit, for example beginning at step 51. After responding to the requesting mobile unit, the base station may re-enter the polling cycle at 40–44, awaiting either a response or the lapse of the threshold time period $t_{th}$.

Figure 6:
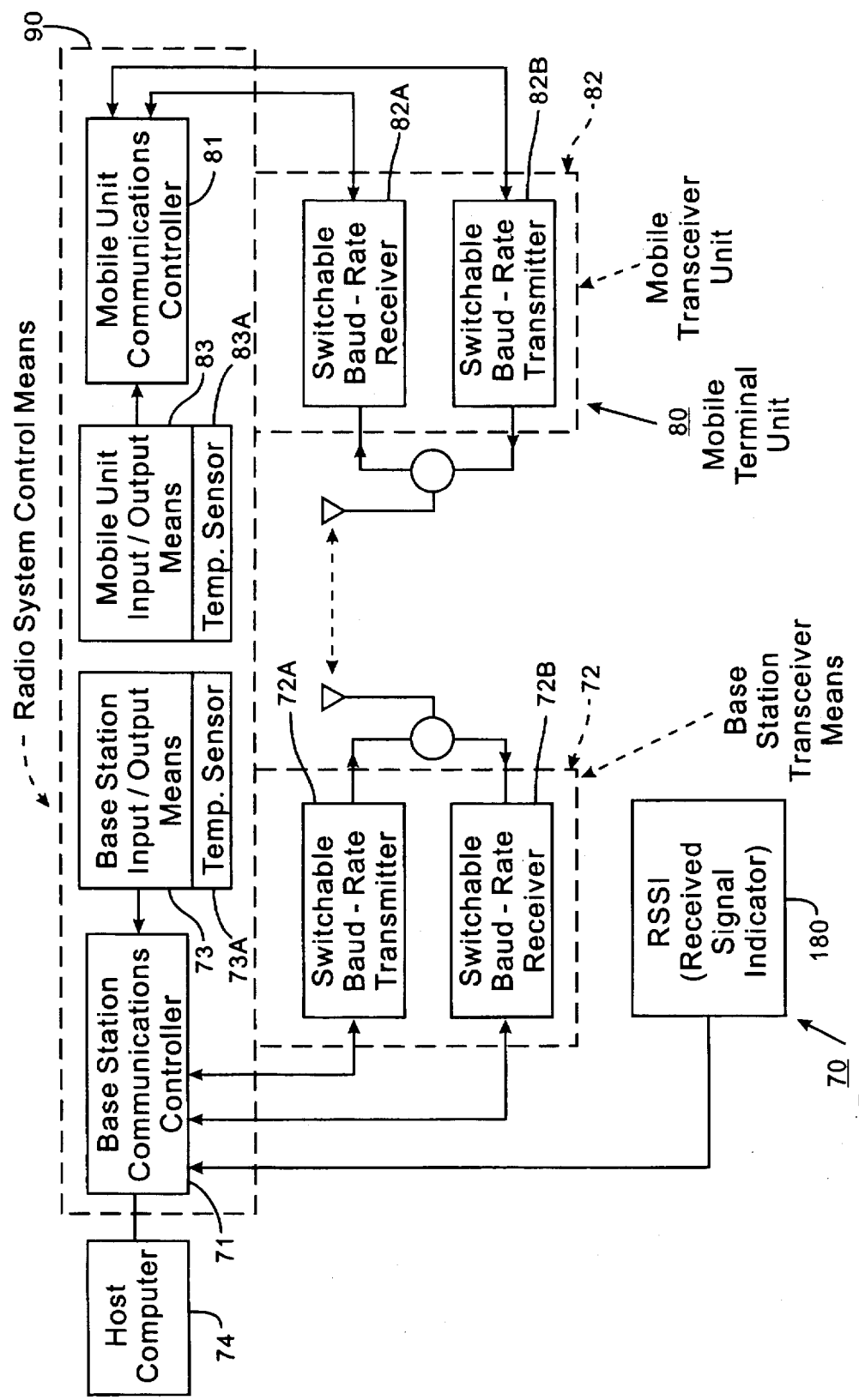
FIG. 6 is a diagrammatic illustration of a mobile radio system which may be compatible with elements of the previous systems of FIGS. 2A through 5 and may substantially enhance system data throughput.

Description of FIG. 6

A radio data system which may utilize the present invention is shown in FIG. 6. Such a system may be compatible with the product families as represented in FIGS. 2A–5. Thus if the system of FIG. 6 utilizes a base station 70 capable of operating at either 4800 bits per second or 9600 bits per second under the control of a communication controller 71, such a base station can be installed in one of the prior systems; e.g. in place of an RB2212 base transceiver, and may operate at a fixed data rate of 4800 bits per second. Subsequently, if upgraded mobile terminal units 80 and terminal communication controller means 81 are introduced into the system, operation at 9600 bits per second becomes available to achieve increased system performance. Communication at 9600 bits per second generally requires a stronger radio signal than communication at 4800 bits per second, so that the system of FIG. 6 may be designed to recognize when the signal strength is insufficient and to switch automatically to 4800 bits per second. Eventually, the system can be upgraded to utilize exclusively terminal units such as the unit 80. The data rate of 4800 bits per second offers both the potential for direct compatibility with earlier products and a "fall-back" mode if signal strength does not allow communication at 9600 bits per second. A system such as the one indicated in FIG. 6 can be reached in stages with each upgrade step providing the user with increased performance and productivity that justifies the incremental cost. Since the largest investment is in the terminals, the upgrade strategy minimizes terminal obsolescence, offering the greatest possible useful life of the users' investment.

In a system such as the one indicated in FIG. 6, the transmitter and receiver components 72A, 72B and 82A, 82B may be switchable between data rates which are related by a factor of two, so that hardware complexity can be minimized. It would be possible to extend the concept to utilize a third data rate such as 1200 baud or 2400 baud for further enhancement of fringe performance. In a preferred system each remote unit 80 is identified by a unique address.

Transmission between the base and the remote units may be initiated by the controller 71 through the use of sequential polling as in FIG. 2B or by means of a contention protocol as in FIG. 5. Using either, the controller 71 may also monitor the period of non-responsive polling to determine whether the threshold time period has lapsed. If so, the controller 71 may place the base in the dormant "listening" state.

In the system of FIG. 6, polling signals such as indicated at 21, 23, 25, 27, in FIG. 2B and such as indicated at 40, 51 and 54 in FIG. 5 may be sent at the standard data rate, e.g. 4800 baud, with terminals switching to transmit 9600 baud when a message transmission is required, and conditions permit, for example in the case of mobile unit #3 during the interval 28 in FIG. 2B. In FIG. 5, it may be assumed that mobile unit #3 was the sole responder in interval 41 and mobile unit #0 was the sole responder in time slot 43. In this case, the poll at interval 51 may be directed to mobile unit #3, and the response of mobile unit #3 during interval 52 may be at the high data rate e.g. 9600 baud. Similarly, the individual poll at interval 54 may be addressed to mobile unit #0, and mobile unit #0 may respond during the following interval at the high data rate e.g. 9600 baud. Polls are typically of short duration, so that the throughput penalty for using the lower data rate for polling is relatively slight. Polling at 4800 baud also maintains backwards compatibility with older equipment, and ensures that units operating under fringe (weak signal) conditions can have access to the base station.

In FIG. 6, the radio base station 70 comprises the base station controller means 71, a base station transceiver means 72, and a base station input/output means 73. Controller means 71 may provide an interface with a host computer 74 as in the system of FIG. 2A, may control the mode of operation (which may include dormant protocol features) and data rate of the base station transceiver means 72, and may serve as an interface to the input/output means 73. The mobile terminal unit 80 comprises terminal controller means 81, mobile transceiver means 82 and terminal input/output means 83. The controller means 71 and 81 together form a radio system control means as represented by dash line/ rectangle 90, responsible for operating the system at a high data rate when feasible, and for automatically shifting to a lower data rate e.g. when a given mobile terminal unit moves beyond the range for reliable high-data-rate transmission.

The terminal controller means also includes means providing the interface to the terminal input/output means 83 as in the earlier versions described above. The controller means 71 may operate the base transceiver 72 so as to execute sequential polling as in FIG. 2B for terminals such as shown in FIG. 2B and such polling and responses thereto will take place at the standard data rate e.g. 4800 baud. Since polling is typically of short duration, polling of the improved terminal units such as 80 may also take place at the standard data rate, e.g. 4800 baud.

It is preferred to poll the improved terminal units such as 80 utilizing a contention poll as in FIG. 5 where there are large numbers of such terminal units with low to moderate activity rates since this procedure does not waste time polling units which do not have data to transmit. Under conditions of zero activity for a period of time exceeding the threshold time period $t_{th}$, the controller means 90 may shift to a dormant "listening" state. While in the dormant state, upon receiving a communication request from one of the mobile terminal units, the controller means 90 may shift back to utilizing a contention poll. Under conditions of heavy usage, the controller means 90 may shift to the sequential polling procedure of FIG. 2B if an excessive number of collisions in the respective time slots prevents efficient communication in the mode of FIG. 5.

FIG. 6 illustrates that the base station, mobile terminals, or both, may include a received signal strength indicator (RSSI) component 92. To characterize signal strength using RSSI, signal strength is sampled several times during receipt of a message and a computation is made to determine average signal strength. This is necessary because of the multipath conditions typically found within buildings and in mobile operation. A fixed threshold would be used for making a data-rate selection based upon signal strength. If signal strength is above threshold, the high rate would be used. If signal strength is below threshold, the low rate would be used.

Description of FIGS. 7A and 7B

FIG. 7A shows a method of operation utilizing the system of FIG. 6, where the base station 70 polls a terminal unit 80 at the standard data rate (represented by level "TX") during an interval 121, and has its receiver 72B in the standard data rate level "RXL" for receiving a response during time interval 122. FIG. 7B represents a polled mobile unit corresponding to unit 80, FIG. 6, but which would not require a switchable data rate receiver. Thus the mobile unit of FIG. 7B would be in a fixed standard data rate receive mode (RX) during time interval 131, and would switch to standard data rate transmit mode (TXL) for transmitting a response message during time interval 132. As in FIGS. 2B and 5, if the base station properly received a message at the high data rate, the base could transmit an acknowledgement at the standard data rate (TX) during interval 141, the mobile unit being in the standard data rate receive mode (RX) as represented at 151.

Exemplary Operation for a System According to FIGS. 2A-3 or 4-5 and FIGS. 6, 7A and 7B In the exemplary mode of operation of FIGS. 7A and 7B, with sequential polling, polling would take place at the standard data rate, e.g. 4800 baud, in time intervals such as indicated at 21, 23, 25, 27 and 30, FIG. 2B, and at 121, FIG. 7A. The base station could be programmed with the data rate capacities of the respective terminal units, and always switch to receive at the standard data rate after polling of a fixed data rate terminal as in FIG. 2B. If, for example, terminal units #0, #1 and #2 were of the fixed data rate type, then receiver 72B would be conditioned to receive response messages at the standard data rate during response time intervals, 22, 24, and 26.

If terminal unit #3 were of the type shown at 80 in FIG. 6, the base station would be programmed to send the poll during time interval 121, FIG. 7A, at the standard data rate and then in a default mode (in the absence of a definite event indicating a lower data rate) would switch its receiver 82A to receive at a higher data rate during the response time interval 122. Each mobile unit such as 80, FIG. 6, in default mode, could have its transmitter 82B ready to transmit during an interval such as 132 at a higher data rate than the standard data rate. Where the standard data rate is 4800 baud, it is preferred to utilize a higher data rate of twice the standard data rate, i.e. 9600 baud, for a communications system such as here described, since such a relationship makes the switchable baseband transmit and receive circuitry simpler. The receiver 82A would not need to be switchable but could be fixed to receive at the standard data rate, e.g. 4800 baud, as at 131. In this case, a mobile unit such as 80 with address #3 would receive the poll during time interval 131, and be ready to transmit its message at a higher data rate, e.g. 9600 baud. In correspondence with FIG. 4, the mobile terminal unit may switch from receive to transmit (R/T) mode in fifteen milliseconds during interval 160.

The base station 70 may receive the high data rate message and issue an acknowledgement at the standard data rate during interval 141. If the message is received with an unacceptable number of errors, controller 71 may be programmed to transmit a switchover signal to mobile unit #3, e.g. during interval 141, commanding that the message be retransmitted at the standard data rate, and storing a corresponding switchover command in its polling control memory, e.g. when the switchover command is acknowledged by unit #3 as at 162. In the case of a mobile terminal of a passive type, mobile unit #3 could then have its transmitter 82B operate in the standard data rate mode until a new start-up of operation, e.g. on a subsequent working day, or until it received a special switchback signal from the base station.

During standard data rate mode, mobile unit #3, even with no message to transmit, would operate so as to receive any messages directed to it by the base station. Once the base station had registered a given mobile unit, e.g. #3, as having switched to transmission at the standard data rate, the base station could execute a program controlling a tentative resetting of such mobile unit to a higher data rate. In a simple case, the base station could instruct the mobile unit to attempt a high data rate transmission by sending a switchback polling message during an interval such as 27, FIG. 2B, or 51, FIG. 5, after the expiration of a given number of polling cycles. If message traffic was heavy, each polling cycle would tend to be of longer duration, reducing the frequency of such high data rate trials.

Figure 7C:
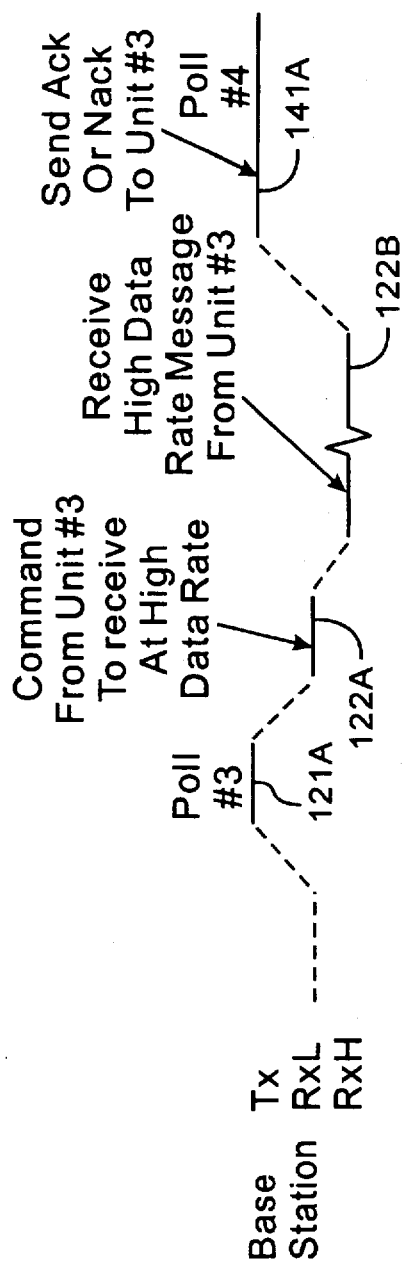
FIGS. 7C and 7D illustrate a further implementation of FIG. 6 which uses the same graphical format as FIGS. 7A and 7B to illustrate successive switching modes, but wherein selection of data rate is made at the individual mobile unit.
Figure 7D:
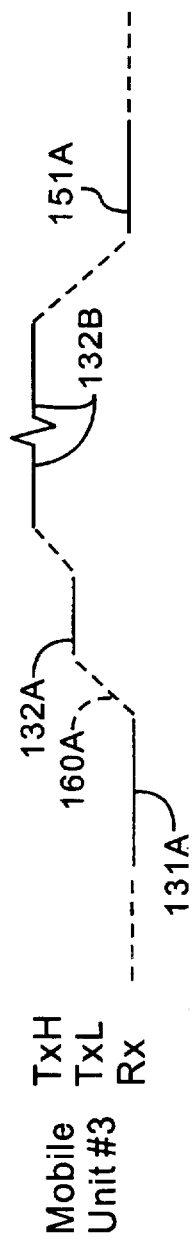

Description of FIGS. 7C and 7D

FIG. 7C shows a method of operation utilizing the system of FIG. 6, where the base station 70 polls a terminal unit 80 at the standard data rate (represented by level "TX") during an interval 121A, and has its receiver 72B in the standard data rate level "RXL" for receiving a response during time interval 122A. FIG. 7D represents a polled mobile unit corresponding to unit 80, FIG. 6, but which would not require a switchable data rate receiver. Thus the mobile unit of FIG. 7D would be in a fixed standard data rate receive mode (RX) during time interval 131A, and would switch to standard data rate transmit mode (TXL) for transmitting a response message during time interval 132A and then switch to high data rate mode for interval 132B. As in FIGS. 2B and 5, if the base station properly received a message at the high data rate during interval 122B, the base could transmit an acknowledgement at the standard data rate (TX) during interval 141A, the mobile unit being in the standard data rate receive mode (RX) as represented at 151A.

In FIGS. 7A and 7B, with sequential polling, polling would take place at the standard data rate, e.g. 4800 baud, in time intervals such as indicated at 21, 23, 25, 27 and 30, FIG. 2B, and at 121, FIG. 7A. The base station could be programmed with the data rate capacities of the respective terminal units, and always switch to receive at the standard data rate after polling of a fixed data rate terminal as in FIG. 2B. If, for example, terminal units #0, #1 and #2 were of the fixed data rate type, then receiver 72B would be conditioned to receive response messages at the standard data rate during response time intervals 22, 24 and 26.

If terminal unit #3 were of the type shown at 80 in FIG. 6, the base station would be programmed to send the poll during the time interval 121, FIG. 7A, at the standard data rate and then in a default mode (in the absence of a definite event indicating a lower data rate) would switch its receiver 82A to receive at a higher data rate during the response time interval 122. Each mobile unit such as 80, FIG. 6, in default mode could have its transmitter 82B ready to transmit during an interval such as 132 at a higher data rate than the standard data rate. Where the standard data rate is 4800 baud, it is preferred to utilize a higher data rate of twice the standard data rate, i.e. 9600 baud, for a communication system such as the one described here, since such a relationship makes the switchable baseband transmit and receive circuitry simpler. The receiver 82A would not need to be switchable but could be fixed to receive at the standard data rate, e.g. 4800 baud, as at 131. In this case, a mobile unit such as 80 with address #3 would receive the poll during time interval 131, and be ready to transmit its message at a higher data rate, e.g. 9600 baud. In correspondence with FIG. 4, the mobile terminal unit may switch from receive to transmit (R/T) mode in fifteen milliseconds during interval 160.

The base station 70 may receive the high data rate message and issue an acknowledgement at the standard data rate during interval 141. If the message is received with an unacceptable number of errors, controller 71 may be programmed to transmit a switchover signal to mobile unit #3, e.g. during interval 141, commanding that the message be retransmitted at the standard data rate, and storing a corresponding switchover command in its polling control memory, e.g. when the switchover command is acknowledged by unit #3 as at 162. In the case of a mobile terminal of a passive type, mobile unit #3 could then have its transmitter 82B operate in the standard data rate mode until a new start-up of operation, e.g. on a subsequent working days or until it received a special switchback signal from the base station.

During standard data rate mode, mobile unit #3, even with no message to transmit, would operate to receive any messages directed to it by the base station. Once the base station had registered a given mobile unit, e.g. #3, as having switched to transmission at the standard data rate, the base station could execute a program controlling a tentative resetting of such mobile unit to a higher data rate. In a simple case, the base station could instruct the mobile unit to attempt to transmit at a high data rate by sending a switchback polling message during an interval such as 27, FIG. 2B, or 51, FIG. 5, after the expiration of a given number of polling cycles. If message traffic was heavy, each polling cycle would tend to be of longer duration, reducing the frequency of such high data rate trials.

In FIGS. 7C and 7D, with sequential polling, polling would take place at the standard data rate, e.g. 4800 baud, in time intervals such as indicated at 21, 23, 25, 27 and 30, FIG. 2B, and at 121A, FIG. 7C. If terminal unit #3 were of the type shown at 80 in FIG. 6, the base station would be programmed to send the poll during time interval 121A, FIG. 7c, at the standard data rate and then switch to receive at 122A, also at the standard data rate. If the transmitted response during interval 132A contains a command indicating operation at the higher data rate, the base would switch its receiver 82A to receive at a higher data rate during the remainder of the response time interval 122B. Each mobile unit such as 80, FIG. 6 in default mode, could have its transmitter 82B ready to transmit at the standard data rate during an interval such as 132B rather than at a higher data rate than the standard data rate. Where the standard data rate is 4800 baud, it is preferred to utilize a higher data rate of twice the standard data rate, i.e. 9600 baud, for a communication system such as the one described here, since such a relationship makes the switchable baseband transmit-and-receive circuitry simpler. The receiver 82A would not need to be switchable but could be fixed to receive at the standard data rate, e.g. 4800 baud, as at 131A. In this case, a mobile unit such as 80 with address #3 would receive the poll during time interval 131A, and would be ready to transmit the baud-rate switching command during interval 132A at the lower data rate, e.g. 4800 baud. In correspondence with FIG. 4, the mobile terminal unit may switch modes from receive to transmit (R/T) in fifteen milliseconds during interval 160A.

The mobile unit may send its high data rate message during interval 132B, the base station 70 receiving the high data rate message as indicated at 122B and issuing an acknowledgement at the standard data rate during interval 141A. If the message is received with an unacceptable number of errors, controller 71 may be programmed to transmit a not-acknowledge (NACK) to mobile unit #3 during interval 141A, since the mobile unit is in a state to receive the message as represented at 151A. Controller 81 of mobile unit #3 may be programmed either to attempt retransmission at the high data rate during the following polling cycle or to retransmit at the low data rate, depending on whether recent previous attempts at the high rate of transmission had also failed.

Having switched to transmission at the standard data rate, controller 81 of mobile unit #3 could execute a program controlling a tentative resetting of the mobile unit to a higher data rate. In a simple case, the controller could attempt a high data rate transmission by sending a switchback message during an interval such as 41, 42, 43 or 44, FIG. 5, or such as 132A, FIG. 7D, after the expiration of a given number of polling cycles. If message traffic was heavy, each polling cycle would tend to be of longer duration, reducing the frequency of such high data rate trials.

Figure 8A:
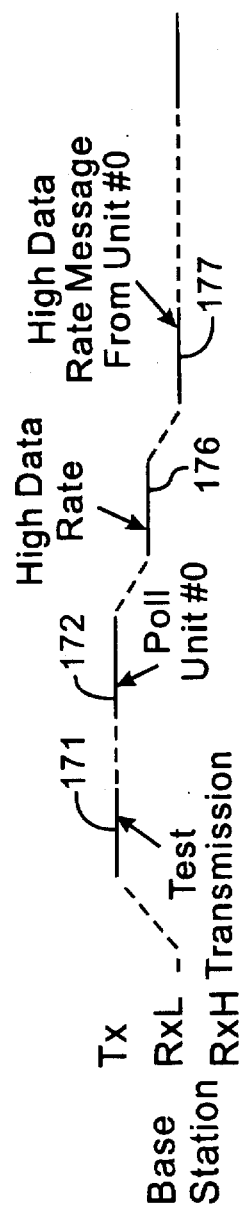
FIGS. 8A, 8B, 8C, and 8D are plots similar to that of FIG. 7A, but illustrating an embodiment in accordance with FIG. 6 wherein the base station sends a test transmission (FIGS. 8A and 8B) or transmits temperature information (FIGS. 8C and 8D) to all of the mobile units simultaneously, FIGS. 8A and 8C relating to a sequential polling protocol, and FIGS. 8B and 8D illustrating an example with a contention protocol.

Description of FIGS. 8A, B, 8C and 8D

A mobile unit such as 80 may include a temperature sensor for sensing ambient temperature. Such a temperature sensor may be associated with the terminal input/output means as indicated at 83A, FIG. 6. Such a temperature sensor may be incorporated in the mobile terminal unit for use in connection with digitally controlled oscillator compensation, bias compensation of liquid crystal displays, or over/under temperature sense and shutdown, for example. The temperature sensor 83A is useful in determining data rate since temperature changes at the transmitter 82B can cause a shift of the frequency of the RF carrier. The base station input/output means 73 may also include a temperature sensor 73A, and a digital measure of ambient temperature at the base is useful in controlling data rate since the local oscillator frequency of receiver 72B is affected by temperature.

It is advantageous to communicate the temperature of the base unit 71 to the mobile unit 80 so that the mobile unit can obtain a measure of any difference in ambient temperature between the mobile unit and the base unit. As the magnitude of the temperature difference begins to become large, the received high data rate signal becomes skewed (relative to the center of the IF filter passband). This results in distortion in the recovered data, which eventually with increasing magnitude of the frequency error makes data recovery impossible. Signals with higher frequency components are more susceptible to this effect, so that operation may still be feasible at the standard data rate.

Figure 8B:
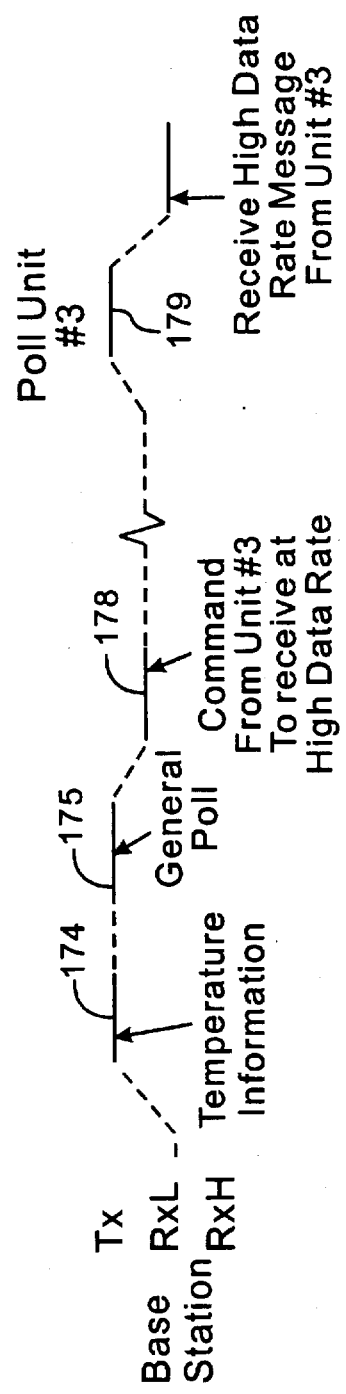

Knowing the temperature of the unit, and the approximate profile of average frequency vs. temperature, there are alternative ways to aid data rate selection. A preferred way would be to break the operating temperature range into three regions where the frequency is likely to be either near its nominal value, high, or low. In the system of FIGS. 8A and 8B, the nominal regions might encompass the temperature range where the frequency is likely to be within +/−1 KHz which is about +/−2 ppm at 450 MHz, or +/−0.8 ppm at 800 MHz. The high regions would be those where the frequency is likely to be above this value, and the remainder would be classified as low regions. A simple high, nominal, or low indication would be communicated over the link to establish a data rate. Because of the statistical nature of the temperature profiles, the only time that temperature information would be heavily utilized to make a data rate decision would be when two units wishing to communicate were at opposite extremes, e.g. high and low, or low and high.

From a practical standpoint, it is more efficient for each portable unit to determine the magnitude of the temperature differential relative to the base, since in this case the base can transmit its temperature information to all mobile units once each polling cycle, minimizing system overhead. If the portable unit determines that base and portable frequency error are at opposite extremes, the data rate will revert to the standard rate.

Figure 8C:
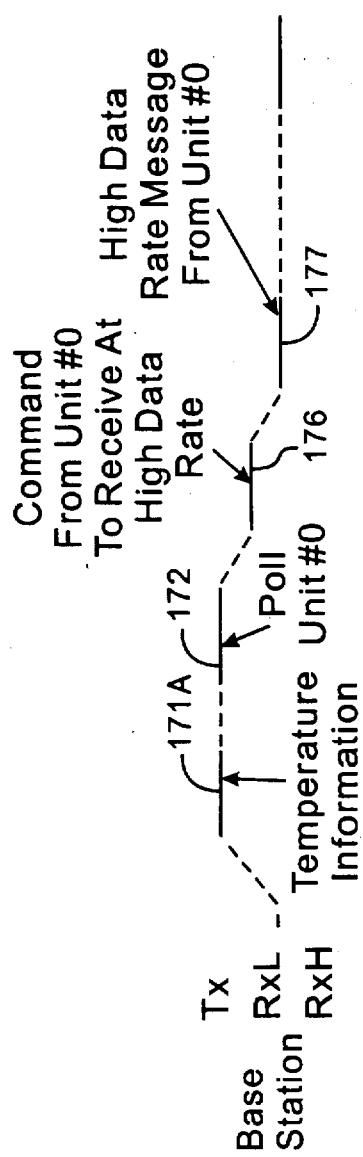

For the case of sequential polling, temperature information from the base station 70, FIG. 6, can be transmitted during an interval such as indicated at 171, FIG. 8A, or 171A, FIG. 8C, prior to polling of a first mobile unit as at 172, FIGS. 8A and 8C. In a contention polling procedure, temperature information from the base station 70 can be transmitted as indicated at 174, FIG. 8B, or 174A, FIG. 8D, prior to a general poll at interval 175.

Figure 8D:
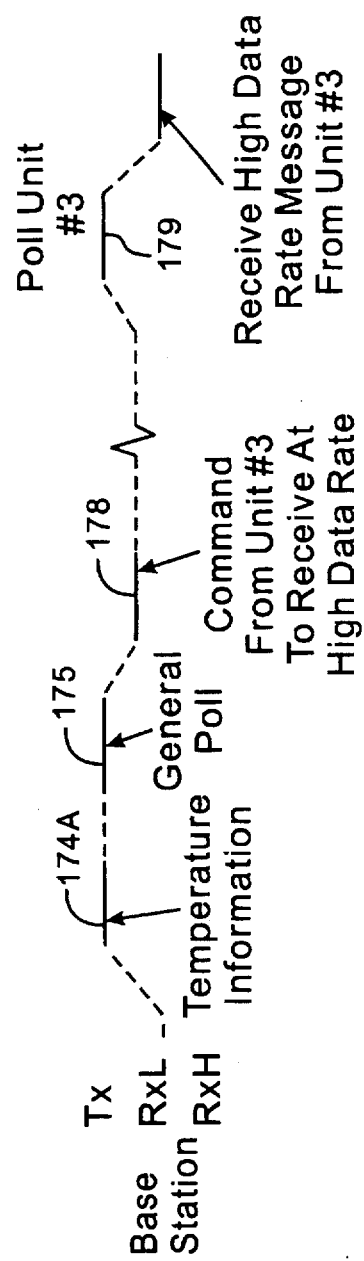

In FIGS. 8A and 8B, temperature information may be sent as part of a test transmission which will also include, for example, transmission of a known sequence particularly sensitive to jitter or other disturbances. FIGS. 8C and 8D represent the case where only base temperature information is sent prior to a polling signal.

Each mobile unit having a message to transmit will evaluate the temperature at the base 70 with respect to the ambient temperature at the mobile unit as sensed at 83A, FIG. 6, and will determine the correct data rate for its message. For example, the first mobile unit may respond to its poll at 172, FIG. 8A or FIG. 8C, by transmitting a signal during interval 176, FIG. 8A or FIG. 8C, indicating whether its message will be sent at the standard data rate or at the higher data rate. The base station will then operate its receiver 72B to receive the message during interval 177.

Similarly for the case of FIG. 8B or FIG. 8D, each mobile unit such as 80 having a message to transmit will evaluate the base temperature information in relation to its ambient temperature, and respond in a selected time slot such as 178 with a message indicating its address and whether its message will be transmitted at the standard data rate or at the higher data rate. Then when the mobile unit is polled individually by the base as at 179, the mobile unit will proceed to send its message at the selected data rate. In FIG. 8D, the temperature information and general poll signal may be combined and transmitted as a unitary signal burst e.g. during the general poll interval 175A, so that the separate transmission interval 174A may be omitted.

Figure 9A:
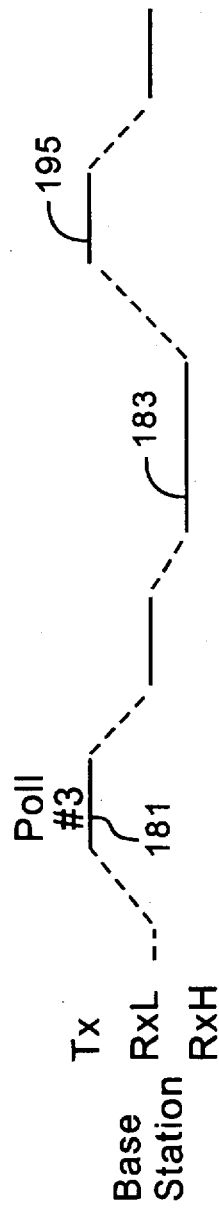
FIGS. 9A and 9B are diagrams similar to those of FIGS. 7A and 7B, illustrating an embodiment in accordance with FIG. 6 where each mobile unit may transmit a test pattern at a high data rate to the base station.
Figure 9B:
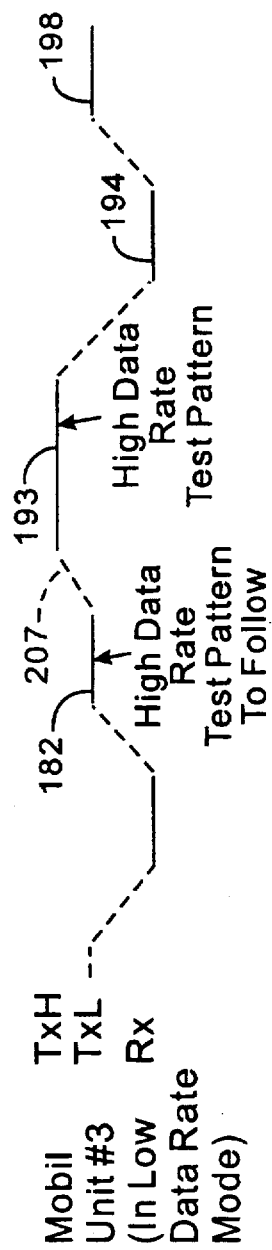

Description of FIGS. 9A and 9B

For the case of sequential polling, FIG. 9A shows the polling at 181 of a mobile unit such as 80, FIG. 6, whose transmitter 82B has been switched over to the low data rate mode, for example as described in reference to FIG. 7A and 7B. Where the mobile unit has a message to send, it may affirm this in interval 182 by means of a test precursor signal at the low data rate during interval 182. This signal at 182 causes the base station to switch to high data rate reception at 183, whereupon the mobile unit sends a test pattern at the high data rate during the corresponding interval 193. Ideally a special test pattern would be sent during interval 193 which was designed to be particularly sensitive to marginal transmission conditions. If the test pattern were sent ahead of the message to be transmitted, then the mobile unit could pause as at 194 to receive approval from the base of its transmitted test pattern before proceeding to send its message, so that the message could be sent at either the high data rate or at the standard data rate depending on the decision signal from the base at 195. Thus, if the base sends a switchback signal at 195, the mobile unit switches to the high data rate (TXH) and sends its message as indicated at 198.

For the case of contention polling, the mobile unit would first respond as in FIG. 5, and at the interval such as 52A, FIG. 5, would send the test precursor signal as at 182, FIG. 9B. Again the data message would be sent at the high data rate (as at 198, FIG. 9B) if the high data rate test pattern (as at 193) was approved by the base (as at 195). For either sequential or contention polling, the mobile unit could omit the high data rate test pattern and simply resume operation at the high data rate until otherwise instructed by the base.

The test precursor signal at 182, FIG. 9B, could include temperature information as described for interval 171, FIG. 8A, or 174, FIG. 8B, so that FIGS. 9A, 9B could include the features of FIGS. 8A, 8B also.

As explained in reference to FIGS. 8A and 8B, it is advantageous if the base can send a data rate decision-relevant signal to all remote units simultaneously in the process of dynamic data-rate selection. Thus, in FIG. 8A, the transmission at 171 may include any of the test signals disclosed here. For the case of FIG. 8B, any such test signal may be transmitted at the low or standard data rate in interval 174, or may be included in or comprise the general poll signal at 175. Alternatively, a high data rate test signal may be sent at an interval corresponding to interval 171, FIG. 8A, or interval 174, FIG. 8B.

Description of FIGS. 10 and 11

FIGS. 10 and 11 illustrate embodiments where a switchable baud rate transmitter is utilized as indicated at 72A, FIG. 6, to send a special high data rate test pattern. Ideally a special test pattern designed to be particularly sensitive to marginal transmission conditions would be used.

For the case of sequential polling as represented in FIG. 10, the base station may send the high data rate test pattern as indicated at 201, interlaced with its regular polling of respective mobile units as at 202. If for example, mobile unit #0 received the test pattern properly, and had a message to transmit it could respond at interval 203 with a switch to high data rate signal, and thereafter send its message at the high data rate, for reception during time interval 204. If the test pattern had not been received properly, the mobile unit #0 would respond at the low data rate to be received as indicated at 28 in FIG. 2B. The switch between transmission at high and low data rates as at 206, FIG. 10, or as at 207, FIG. 9B, would have a duration so as to provide a suitable stabilization period. The required delay for data rate switchover is dependent on the hardware implementation in both the transmitting and receiving equipment.

For the case of contention polling as in FIG. 11, a high data rate test pattern may be sent during a time interval 210 which precedes or follows the general poll at 211. For example, as shown in FIG. 11, the high data test rate pattern may occur during an interval corresponding to the first response time slot such as 41, FIG. 5, in which case all mobile units would be programmed to avoid selection of this slot for contention purposes.

Where the test pattern preceded the general poll as at 40, FIG. 5, each mobile unit would switch to high data rate reception after receiving an acknowledgement as at 53, FIG. 5, or for mobile units with no message to send, these units could remain in low data rate reception mode until data was ready to send, and then switch to high data rate reception to determine if high data rate transmission was feasible (i.e. by evaluating reception of the test pattern transmitted by the base).

Figure 12:
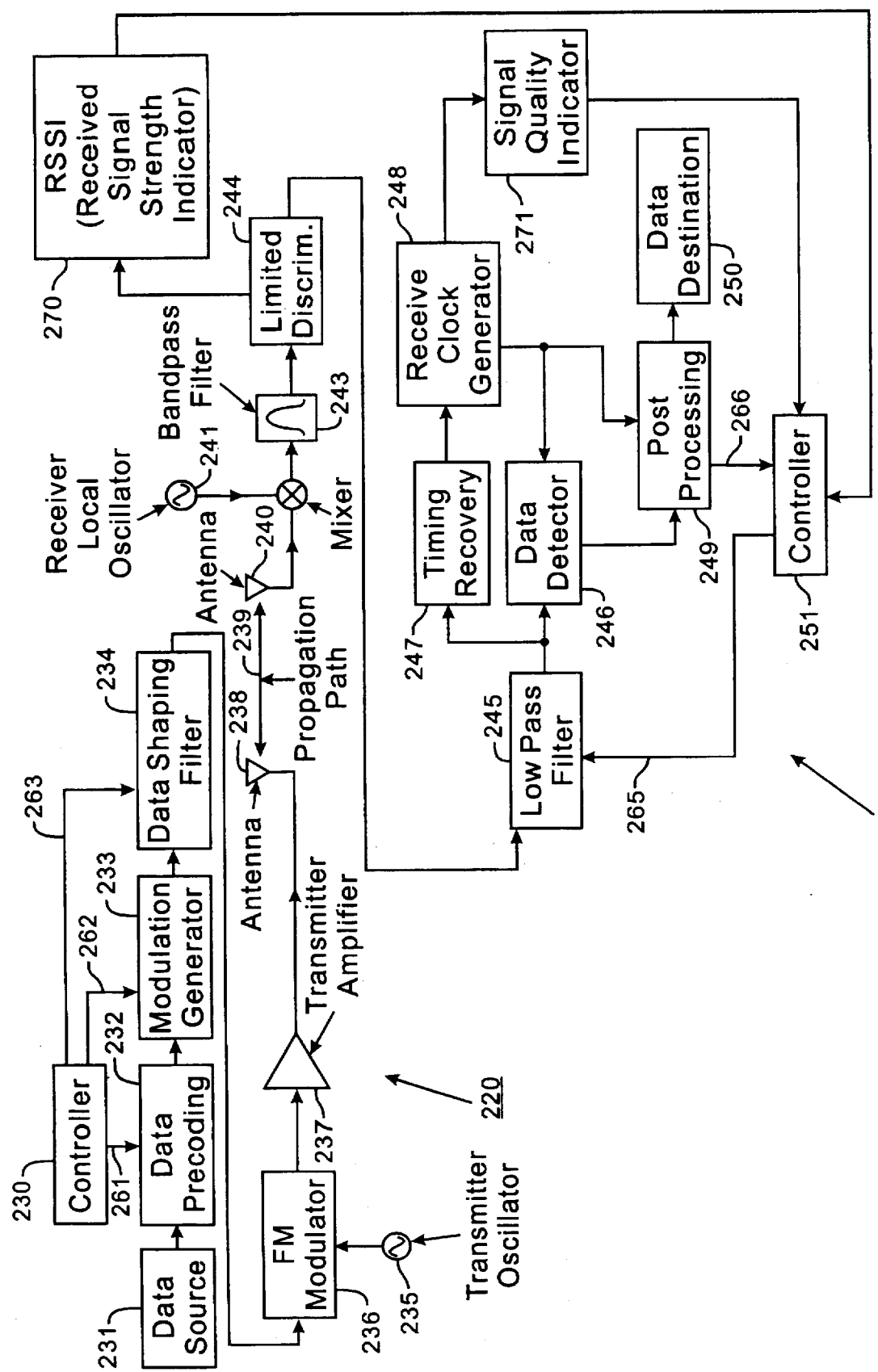
FIG. 12 is a schematic block diagram illustrating an exemplary hardware implementation of the system of FIG. 6.

Description of FIG. 12

FIG. 12 shows exemplary relevant details for a transmitter 220 which may correspond with transmitter 72A or 82B, FIG. 6, and for a receiver 221 which may correspond with receiver 72B or 82A, FIG. 6. The reference numerals in FIG. 12 designate elements of the system as follows: 230, communication controller; 231, data source; 232, preprocessing and encoding section; 233, modulation generator; 234, data shaping filter; 235, transmitter oscillator; 236, FM modulator; 237, transmitter amplifier; 238, antenna; 239, propagation path; 240, antenna; 241, receiver local oscillator; 242, down conversion mixer; 243, intermediate frequency (IF) bandpass filter; 244, limiter/discriminator demodulator; 245, band-limiting low pass filter; 246, baseband data detector; 247, timing recovery section; 248, clock generator; 249, data post processing section; 250, data destination; 251, communication controller. A description of an exemplary implementation of the baseband processing components is as follows:

(1) Digital Pre-processing Section 232

This function is provided using a commercially available serial communication controller (SCC). This device is programmable under software control so data rate may be changed without the need for additional hardware. The SCC accepts raw data in parallel form, adds system overhead functions, such as framing, error detection, and control bits, and clocks out serial data at the proper baud rate. It also controls operation (on/off) of the transmitter.

(2) Modulation Generator 233

The NRZ formatted data supplied by the serial communication controller of section 232 is a single ended logic level signal. Modulation generator 233 includes a level translator which converts this input signal to a signal which is symmetrical around a d.c. reference voltage. This reference is used for the remainder of the baseband analog processing circuitry.

The signal from the level translator is supplied to a level adjust circuit which may comprise a simple resistive attenuator for scaling the signal to provide the proper FM deviation of the carrier. In the exemplary FM data transmission system, occupied bandwidth is sixteen kilohertz maximum, with five kilohertz maximum frequency deviation. This occupied band width constraint restricts the allowed deviation at higher data rates. The need to adjust deviation for the different data rates is brought about by a combination of system considerations, (optimizing deviation to maximize link performance at the individual data rates) and regulatory restrictions on maximum occupied bandwidth.

In the exemplary system the circuit is designed to switch the attenuation to optimize the deviation for each data rate.

In particular, the level adjust circuit is designed to switch in additional attenuation when operation is desired at 9600 baud. Control line 261, FIG. 12, may control the serial communication controller to effect the change of data rate between 4800 baud and 9600 baud, for example, and control line 262 may correspondingly control the switching in of additional attenuation for 9600 baud operation.

(3) Transmit Data Shaping Filter 234 The data shaping filter may comprise a linear phase response low pass filter with a passband-width matched to the data rate. Its purpose is to minimize the occupied bandwidth of the transmitted signal. A switched capacitor filter implementation is used in the design which allows the bandwidth to be adjusted for 4800 baud or 9600 baud operation simply by changing an external provided clock which may be provided from controller 230 via line 263, FIG. 12. The filtered signal is supplied to the radio transmitter FM modulator 236 for RF transmission.

(4) Recieve Low Pass Filter Circuit 245

An input circuit to the low pass filter proper may provide an amplitude adjustment so that the incoming signal from limiter-discriminator demodulator 244 can be set to the proper level for the low pass filter and data recovery detector circuits to follow. The purpose of the receive filter is to minimize inter-symbol interference at the receive data recovery circuitry. It also provides a d.c. offset to center the signal within the input range of the low-pass filter and zero crossing detector. The low-pass filter itself and may be a switched capacitor linear phase filter similar to the filter used in component 234 of the transmitter. Its purpose is to remove noise components which are outside of the data bandwidth. The bandwidth of this filter is determined by an external clock signal supplied via a line 265, FIG. 12, from controller 251.

(5) Receive Data Recovery Circuitry 247

This circuitry may function as a zero crossing detector and may comprise a reference recovery circuit and a comparator with hysteresis. The d.c. bias voltage from the filter circuit 245 varies in proportion to the total frequency error in the received signal and local oscillators (the same phenomenon that causes skewing in the IF filters 243). The reference recovery circuit tracks the signal and extracts a reference signal which is applied to the comparator. The comparator compares the incoming signal against the reference to detect zero crossings in the data. Hysteresis is utilized to provide additional noise immunity under weak signal conditions.

A zero-crossing-detection approach is considered advantageous because it is relatively insensitive to the amplitude distortion that occurs in the receiver at the data rate of 9600 baud. Such a circuit is selected because its operation is relatively data rate independent. It can be used at 4800 baud or 9600 baud without adjustment.

(6) Timing Recovery and Clock Generator

The function of the timing recovery circuit is to synchronize a locally generated data clock signal with the incoming NRZ data. Possible implementations include an early-late gate or phase locked loop. By continuously monitoring the degree of coincidence of received data transitions and the recovered clock signal, a signal quality indication can be derived for use in making data rate selection decisions. The recovered clock signal may be used to gate the data recovery circuit at the center of each received bit, which may provide improved performance at the expense of more complex hardware.

Timing recovery may be performed in parallel with data recovery as shown in FIG. 12, or serially, following data recovery.

(7) Digital Post-Processing

As with component 232 of the transmitter, this function may implemented in a serial communication controller. The primary functions of this device are to remove system overhead information that was added for transmission, perform error control analysis, and provide the raw data to the data destination. It may also be used to perform some or all of the timing recovery function, if the serial implementation is selected. Data rate is programmable under software control and may be controlled from controller 251 as represented by control line 266.

Data source 231 and data destination 250 may be implemented as a universal asynchronous receive/transmit circuit (UART) which supplies data to the component 232 during transmitting operation and which receives data from post-processing component 249 during reception operation. The controller such as 230 or 251 may be connected in parallel with such a UART component for inputting data thereto for transmission, and for receiving data therefrom, in parallel, during reception. Alternatively, data may be provided to the controller via direct memory access or DMA. In this approach the serial communication controller stores the received data in a designated memory location where it can be directly retrieved by the controller.

It will be understood by those skilled in the art that in practice, the timing recovery section 247, clock generator 248, and the controller components may all be implemented in a single microprocessor, as would a portion of the receiver post-processing section 249.

The circuitry of FIG. 12 represents a narrow-band frequency modulation (FM) radio data communication system. FIG. 12 shows a received signal strength indicator (RSSI) 270 associated with the limiter-discriminator section 244, and a signal quality indicator 271 associated with the clock generator 248. Components 270 and 271 will now be discussed in separately headed sections.

(1) RSSI Component 270

Several commercially available integrated-circuit FM demodulators now incorporate the RSSI function. In operation, an output voltage or current is provided proportional to the degree of limiting in the limiter portion of the integrated circuitry. The RSSI output may be applied to an analog to digital converter and then to the microprocessor of a controller such as 71 or 81, FIG. 6, or 251, FIG. 12. The programming of the microprocessor of the controller may then determine the presence and signal strength of the carrier, and make a decision as to whether it is desirable to revert to the lower data rate. The individual polling signals such as 21, 23, 25, 27 in FIG. 2B and such as 51 and 54 in FIG. 5 may take a special form for signaling the respective addressed terminal unit that messages are to be transmitted at the lower data rate until further notice. Since factors other than signal strength influence the ability to use higher data rates, such as skewing of the received signal frequency and receiver local oscillators due to temperature. It is conceived that other criteria may be utilized along with received signal strength to determine when switching to the lower data rate is advisable.

In evaluating multipath effects the RSSI output should be sampled several times during receipt of a message. Data rate selection should be based upon a weighted average value. The weighing function should give emphasis to the lower signal strengths measured since the average strength of a fading signal tends to approximate its peak value.

(2) Siqnal Quality Indicator 271

A preferred method of evaluating whether to switch to a low data rate is to use a signal quality indicator derived from the receive clock generator 248. This indicator would produce a signal by comparing the regenerated receive clock which would contain some amount of jitter due to noise and distortion in the radio link, with the ideal clock. A test pattern as described with reference to FIGS. 9A, 9B, 10 and 11 would most likely still be advantageous so as to make the measurement more reliable and sensitive.

The receiving unit performs a qualitative analysis of the 9600-baud signal, e.g. a special test pattern, by sensing the jitter in the received signal. Most of the signal quality indicator circuit 271 can easily be implemented in any one of a number of commercially available programmable logic devices. The control portion may utilize the on-board microcomputer of the controller 251. Alternatively, the entire jitter characterization function could be implemented in software given a sufficiently powerful microcomputer.

By way of example, the test pattern may consist of an initialization sequence used to establish timing, and a known bit pattern. The jitter characterization circuit 271 is held in a standby mode until the initialization sequence is expected. The initialization sequence may consist of an alternating pattern of eight ones and zeros. A clock pattern can be used for synchronization because the time uncertainty of the beginning of the sequence is slight. If uncertainty were greater, a seven-bit Barker sequence could be used.

For timing synchronization, the circuit functions as a sliding correlator. A bit image of the ideal timing initialization sequence sampled at seven samples per bit (11111110000000. . .) is loaded from the pattern memory into the compare register. The incoming data is sampled as shifted into the shift register at seven times the bit rate. After each shift operation, the shift register and compare register are exclusive or-ed, and the degree of correlation (number of errors) determined. This continues until the number of errors detected is less than a maximum error threshold (in this case thirteen errors). At that point, the shift operation continues as long as the number of errors continues to decrease. When an increase in the number of errors is noted, synchronization is assumed to have occurred on the previous clock sample. If the number of detected errors does not decrease to below the threshold within a timeout period, the remainder of the data characterization is not performed, and e.g. 4800-baud operation is used.

Once clock synchronization has been obtained, the circuit enters a block correlation mode. A fifty-six-bit image of the first eight bits of the pseudo-random test pattern is loaded into the comparison register. Incoming data is clocked in for the next fifty-five clock cycles. (Fifty-five cycles are used for the first comparison because the bit synchronization is one clock cycle off. Thereafter, fifty-six cycles are used.) At the end of the clock period, the shift register and compare registers are exclusive or-ed, and the number of errors determined. The next fifty-six bit image is then loaded into the comparison register and the next fifty-six samples are shifted in. This process continues for the duration of the test pattern.

A running total of the number of detected errors, including those noted in the synchronization process, is maintained throughout the characterization process. At the conclusion of the process, the total number of errors is compared against a threshold value to make the data rate decision. The threshold for selecting e.g. 9600-baud operation is sixty errors out of two hundred eighty samples or twenty-one percent. If the error percentage is above this level, e.g. 4800-baud operation is used.

For embodiments such as shown is FIGS. 10 and 11, the data rate selection must be communicated to the base station controller means such as 71 in the poll response. This response could also contain a test sequence to characterize the return link as in FIG. 9B. If a reciprocal channel is present, characterization of one of the links only may generally be adequate to establish the data rate, and would result in lower system overhead.

The length of the pseudo-random test pattern used is somewhat arbitrary. An initial design uses a pattern of a length of forty bits, including eight bits for synchronization. The forty bit pattern length was selected because it represents a good compromise between signal characterization and low system overhead. It is more than adequate to characterize the degradation of the link due to poor signal strength and distortion in the channel.

If a signal quality indicator is available from the received clock generator, the use of a correlator is a redundant function. The test pattern could be used in either case.

General Discussion of FIG. 12

FIG. 12 particularly illustrates a system for upgrading the present commercial system as described in reference to FIGS. 2A–5. Thus, the system of FIG. 12 may be operated so as to be compatible with the earlier mobile units of FIG. 2A–3 which form part of the commercial RT1200 system, and may also utilize terminals as represented in FIG. 4 forming part of the RT2200 commercial system. To accommodate such mobile terminal units, the system of FIG. 12 may conduct its polling operations at the standard data rate of 4800 baud. Additionally, the dormant polling protocol features may be incorporated so as to provide a clear channel when polling is unnecessary. Thus, the system of FIG. 12 is particularly adapted for use in inventory management and material control applications in retail stores, warehousing, and manufacturing, for example, allowing operators at remote locations to communicate interactively with a central computer system on a real-time basis.

The radio system of FIG. 12 may utilize a star network configuration. The base station may comprise receive and transmit sections as in FIG. 12 and may utilize a single communication controller for performing the functions of controllers 230 and 251, FIG. 12. Accordingly, the single communication controller of the base station may correspond with controller 71, FIG. 6, and provide a data interface to a host computer such as represented at 74, FIG. 6. Thus, data from the single controller is converted into a radio frequency signal, and signals received from remote units of the two commercial types and from remote units as represented in FIG. 12 are converted into logic level signals and provided to the single controller. The remote units of the three different kinds are designed to be operated in a common system and each may be used either as a hand-held portable device or as a mobile unit on a forklift or other vehicle. Each remote unit has the capability of working with a variety of peripheral devices, the most common of which are various types of bar code scanners. The remote units may utilize an integral microcomputer for performing the functions of controllers such as 230, 251, FIG. 12, and such integral microcomputer then controls operation of the remote unit and provides local processing of user and peripheral device inputs.

The system of FIG. 12 particularly relates to data communication in the ultra-high-frequency (UHF) range. While several different modulation methods would be permitted, frequency modulation (FM) is illustrated in FIG. 12. Equipment operating under these conditions in the United States is subject to the following limitations:

(1) Occupied band width is sixteen kilohertz maximum, with five kilohertz maximum frequency deviation.

(2) Channel spacing is 25 kilohertz. This requires the use of highly selected filtering in the receiver to reduce the potential for interference from nearby radio equipment operating on adjacent channels.

(p3) Maximum output power is generally in the range of ten to three hundred watts. For localized operation in a fixed location, however, transmitter power output may be limited to two watts maximum, and limitations may be placed on antenna height as well. These restrictions are intended to limit system range so as to allow efficient re-use of frequencies.

For non-return to zero (NRZ) data modulation, the highest modulating frequency is equal to one half the data rate in baud. Maximum deviation of five kilohertz may be utilized for a highest modulation frequency which is less than three kilohertz, but lower deviations are generally required for higher modulation frequencies. Thus, at a data rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limiter-discriminator detector for reasonable performance at weak RF signal levels.

The radio transceivers in the base and remote units have been derived from design configurations originally devised for voice equipment, thereby taking advantage of the existing components developed for that market. While the performance of these modules has been optimized specifically for data, cost considerations have dictated that performance goals be compromised in some areas, particularly transmitter and receiver local oscillator frequency stabilities and IF filter characteristics.

For example, in the illustrated embodiment, transmit oscillator 235 and receiver local oscillator 241 may have a frequency stability over a temperature range from minus thirty degrees Celsius to plus sixty degrees Celsius of five parts per million (0.0005 percent).

The IF filter 243 is selected to pass the modulated signal with fidelity, and to provide the required adjacent channel selectivity. The filter pass band must be wide enough to accommodate center frequency errors due to the transmitter and receiver frequency tolerances noted above. Ideally, the filter should have linear pass band phase characteristics to avoid introducing delay distortion in the recovered data. Cost considerations have dictated performance compromises in filter selection. The filters used exhibit both amplitude roll-off and nonlinear phase characteristics near the edges of the pass band, which results in detectable intersymbol interference (ISI) in the recovered baseband signal at higher data rates, particularly when frequency offset error is present.

The following is a summary of some of the factors which prevent reliable continuous operation of the system of FIG. 12 at the higher data rate such as 9600 baud under all operating conditions:

(1) There is a sensitivity penalty for operating at higher data rates. For a given bit error rate (BER) the combination of higher baseband low pass filter bandwidths and lower bit energies dictates a need for a stronger signal at the receiver input than that required for lower data rates. This is compounded by the fact the occupied bandwidth restrictions force the use of lower than optimum deviation when higher data rates are utilized.

If transmitter power is fixed by constraints such as regulations, cost, or battery life, this decrease in sensitivity translates directly into a decrease in system range.

(2) The twenty-five kilohertz channel spacing requirement has resulted in the use of narrow band IF filters in the receiver. These filters tend to provide amplitude roll-off of high frequency components in the recovered data. Furthermore, cost considerations have not allowed the use of filters with linear passband phase characteristics, and this results in delay distortion (jitter) in the recovered data. These effects are most pronounced for data signals with frequency components above three kilohertz.

(3) Changes in ambient temperature cause changes in the transmitter and receiver local oscillator frequencies. This tends to be least detrimental when a base and remote unit are at about the same temperature, and to be most detrimental when they are at opposite temperature extremes. Also, repeated temperature cycling causes aging or long-term drift in the crystal frequency control elements over time. These two effects result in skewing of the received signal so that it is no longer centered in the IF filter, compounding the effects cited in the preceding paragraph (2).

(4) Because the system under discussion here is intended for use within single buildings or complexes of buildings, propagation anomalies such as shadow fading and Rayleigh fading are troublesome. These effects are generally worse for higher data rates both because of the shorter bit intervals involved (shorter integration time in the data recovery process) and because of the sensitivity degradation noted in the preceding paragraph (1).

Because of the difficulties just noted, it is not possible to provide adequate system performance under all conditions in the intended applications at a relatively high data rate such as ten thousand baud. The use of a lower data rate such as 4800 baud provides improvements in system range and reliability even in comparison to a data rate of seven thousand baud. Field experience has proved that a data rate of 4800 bits per second is an excellent compromise for systems that employ limited numbers of remote units and can tolerate the lower throughput rate. Switching the data rate between 4800 baud and 9600 baud instead of between 4800 baud and 10,000baud, for example, is preferred because of lower cost.

Since some transceiver module designs that may be utilized in FIG. 12 do not have RSSI capabilities, it may be preferred to use the RSSI measurement as an optional or secondary indicator, the system still being effective in the absence of component 270, FIG. 12, but with slightly lower throughput efficiency. Where the RSSI measurement is utilized, it is considered desirable to sample the output of component 270 three to five times during a poll interval to gain an accurate indication of signal strength, e.g. to take account of signal fading effects. For initial message transmission, the default data rate to be used may be 9600 baud, unless the RSSI measurement indicates weak signal conditions. Thereafter, 9600 baud will continue to be used until low signal strength is detected, or a communication failure occurs. On failure, the system will revert to 4800-baud message transmission until a retry algorithm initiates another attempt at 9600 baud.

The decision to retry the high data rate may be based on a number of factors in the embodiment of FIG. 12. If poor signal strength indication at component 270 dictates 4800- baud operation, then 9600-baud operation can be attempted as soon as signal strength improvement is noted. If 4800 baud was utilized because of communication failure at 9600 baud, several factors can be considered in determining when to attempt operation again at 9600 baud. These factors include:

(1) Elapsed time since the last 9600-baud attempt. Since remote units are generally hand held or mobile, factors which force the lower data rate are subject to change as the remote units are moved to different locations.

(2) Monitoring of 9600-baud transmissions from the base to other remote units. These transmissions can be used as test patterns to determine if-9600 baud transmissions can be received without errors.

(3) System traffic. If the system is lightly loaded, more frequent attempts at re-establishing 9600-baud communications can be made without introducing unacceptable degradations in system response time. In the sequential polled protocol loading can be determined by measuring the elapsed time between successive polls of a particular address. In the contention protocol, loading can be ascertained by monitoring the number of empty time slots (i.e. time slots in which no response message occurs).

(4) Number of message transmissions since the last 9600-baud attempt. That is, the algorithm may cause a retry of 9600-baud operation every fifth, or tenth or twentieth transmission.

(5) Internal temperature of the base and/or remote unit. Since many of the skewing effects of the IF filters are temperature related, continued temperature extremes (high temperature differential between base and mobile unit) could indicate less frequent retries at 9600 baud should be attempted. Temperature information is available in the remote units for use in other circuits, and can be utilized without introducing additional cost for the unit.

It is known in the art to utilize FM data equipment wherein one of several data rates may be selected by the system user at the time of system installation based upon propagation conditions of the particular installation. A significant disadvantage of the user-switchable approach results from the fact that in many mobile installations propagation conditions are not static, but are subject to dramatic change in the course of short periods of time. This is normally the case in systems utilizing mobile or portable devices. The key characteristics of the approach of the present disclosure, on the other hand, are:

(1) Dynamic adaptive data rate selection takes place automatically to increase data transmission efficiency and reliability where communication may be required under relatively strong and relatively weak signal conditions, and where propagation conditions may change rapidly.

(2) Handshaking between devices may be used to initiate a communication session and to establish the data rate for that session.

(3) Signal quality measurements for determining automatic switching may be based both on direct measurements of signal quality as represented at 271 in FIG. 12, and also on indirect measurements such as represented by the received signal strength indicator component 270, FIG. 12. Additional parameters may be readily introduced by programming.

(4) As shown in FIG. 12, performance characteristics of the baseband signal processing apparatus may be adapted to optimize the devices for communication using the respective different data rates.

(5) As shown in FIG. 12, a preferred approach may involve pre-modulation and post-demodulation signal processing operations only so that it is particularly cost-effective to implement.

Discussion of the Use of a Test Pattern to Evaluate Susceptibility to Jitter

The signal quality indicator 271, FIG. 12, may detect jitter in the recovered data by multiple sampling of the recovered digital data stream e.g. from a test pattern at a rate of ten or more samples per bit to determine the extent to which the intervals between bit transitions differ from the nominal intervals for transmission at 9600 baud. A disadvantage of this approach is that it is beyond the capabilities of the serial communication controller which is preferably utilized in post-processing section 249 and in the associated digital pre-processing component 232 of each transceiver. It can be implemented by providing the recovered data directly to the microcomputer of controller 251. For a presently available low cost microcomputer, this prevents the microcomputer from handling other tasks during the evaluation of the received test pattern. In this implementation, the test pattern can be relatively short, for example, thirty-two bits.

A jitter characterization approach as already described with reference to component 271, FIG. 12, transmits a "worst case" data sequence which is specially selected to have a high susceptibility to noise and distortion. If the serial communication controller (SCC) is able to decode the sequence, transmission at 9600 baud is automatically selected. If it fails to decode the sequence, transmission at 4800 baud is automatically used. The advantage of this jitter characterization approach is that it does not require the use of the microcomputer of the communication controller component. Using this approach requires a longer test pattern, perhaps several hundred bits.

Explanation of the General Concept of Handshaking and Its Application to Data Rate Selection According to the Present Invention The following generalized example explains how data rate selection may take place as between units which utilize a handshaking mode of communication. This example illustrates the application of the teachings of the foregoing embodiments without reference to the particular protocols of FIGS. 2B and 5.

GENERALIZED EXAMPLE (protocol independent)

Consider a radio system that consists of several unit, each with a unique address.

1) In the simplest case, the system may consist of two units, #1 and #2, one or both of which are mobile.

2) In a standby mode of operation both units program their receivers to receive at the low data rate.

3) When a unit has information to communicate, it switches to transmit at the standard rate, and sends a query to the other (target) unit. Following this transmission, the unit switches to once again receive at the standard rate.

4) If the target unit for some reason (e.g. out of range) does not correctly receive the query it makes no response. After a timeout period, the initiating unit may periodically attempt to re-establish the link.

5) If the target unit correctly receives the transmission it performs an analysis to determine the quality of the radio link (propagation path and radio hardware). This may involve combinations of signal strength measurement, jitter in the received data, or use of information communicated in the transmission. A transmission which is to be evaluated as an aid to deciding on a dynamic basis whether a high data rate is feasible is here termed a "test signal" or "test transmission." Based upon the results of the analysis, the unit determines whether to utilize the standard data rate or a higher rate for a subsequent communication session between the two units.

6) The target unit completes the handshake by switching to transmit at the standard rate and communicates its data rate selection to the initiating unit. It then switches to receive at either the standard or higher data rate depending on which it has selected.

7) The initiating unit, upon receipt of the return handshake, switches to transmit its message at the selected data rate.

8) Upon receipt of an end of message indication from the initiating unit, the target unit, switches to transmit at the selected rate, and sends a response or acknowledgement to the initiating unit.

9) If the high rate has been selected, and for some reason signal propagation conditions change during the communication session such that communication at the high rate becomes impossible, the units would after a timeout period attempt to re-establish the session at the standard data rate.

Description of FIGS. 13-16

In the protocol of FIG. 5, the base station and mobile terminals were only capable of single data rate operation at a limited normal data rate. Such a limited normal data rate was selected so that reliable communication could take place over the entire geographical operating range of the mobile transceiver units. Such a normal data rate is selected taking into account that the mobile transceiver units may operate not only at close range where receive signals are strong, but also in fringe areas where received signals are extremely weak. Furthermore, the mobile units may operate under extreme conditions of temperature in comparison with the temperature of the base transceiver station.

FIGS. 13 to 16 illustrate enhanced protocol systems suitable for upgrading a system such as illustrated in FIG. 5 for increased data throughput without requiring the upgrading of firmware in the large population of terminals designed for single data rate operation at the normal data rate. The approach of FIGS. 13 to 16 achieves an advantageous simplicity in operation of the data collection system in spite of the presence of such single data rate mobile terminal units.

In the embodiments of FIGS. 13 to 16, the base/controller station dynamically adjusts the number of slots associated with a low data rate poll based upon channel traffic at the low data rate, and dynamically adjusts the number of slots associated with a higher data rate poll based on channel traffic at the higher data rate. Additionally, as described in relation to FIGS. 1A-1C, the base/controller station may enter a dormant "listening" state whenever no channel traffic exists for a period of time exceeding the predetermined threshold time period $t_{th}$. Upon a request for polling while in a dormant state, the base/controller station may directly enter the polling state at the low data rate or may first respond to the specific request.

A terminal capable of high data rate operation for which the base station has an (outbound) message may be initially identified as part of a multi-terminal poll (MTP) having the high data rate if such high rate was currently being used by such terminal. However, because of the possible rapid variation in operating conditions for each terminal during its movement at varying distances from the base transceiver station, if the base does not receive a response from such a terminal at the high data rate, the base may send the address of such a station as part of further multi-terminal polls at the normal data rate as well as at the high data rate. A terminal having multiple data rate capabilities, with a need to transmit an inbound message, will monitor the higher data rate poll and if such higher data rate poll is successfully received, the received signal will be evaluated e.g. taking account of received signal strength and potential rapid signal fading effects, so as to determine whether transmission should be attempted at the high data rate.

As explained in relation to FIG. 12, the contention polling signal at the higher data rate may have its received signal strength measured at 270, FIG. 12, the RSSI output being sampled several times during receipt, and evaluated according to a weighted average value, the weighing function giving emphasis to the lower signal strengths measured, since the average strength of a fading signal tends to approximate its peak value. The indicator 271 may be utilized to measure jitter due to noise and distortion in the radio link as described with reference to FIG. 12. Further, temperature measurements at the base transceiver unit and at the mobile terminal unit may be compared utilizing temperature sensors such as 73A and 83A as described in reference to FIG. 6.

Figure 13:
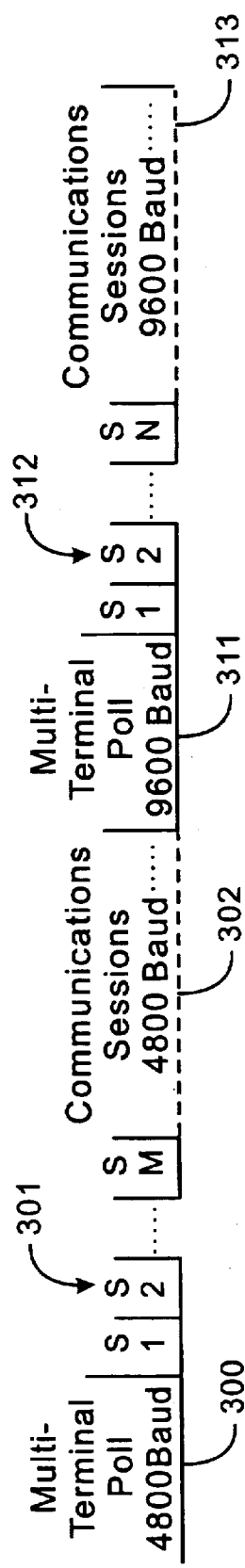
FIGS. 13–16 are diagrams illustrating modes of operating a system utilizing both a limited normal data rate (e.g. 4800 baud) and a higher data rate (e.g. 9600 baud), FIG. 13 showing a general case of M low data rate response slots and of N high data rate response slots, N and M being independently controlled for optimum throughput.

At the conclusion of contention polling at the low date rate, the base station establishes communications with those mobile units that were successfully identified within the allocated number of response slots associated with such low data rate poll. Such communications are established by polling the respective terminal by means of its unique address, receiving the terminal response, and the base transmitting an acknowledgement for each respective terminal. The combination of the multi-terminal contention poll and resulting communication sessions comprises one variable length low data rate communication frame. Such a variable length communication frame is represented in FIG. 13 as comprising a low data rate (e.g. 4800 baud) multi-terminal poll during interval 300, followed by a selected number of response slots S1, S2, ..., SM. The response time interval 301 represented by the total duration of the M slots is then indicated as being followed by a low data rate (e.g. 4800 baud) communication session during an interval 302.

In FIG. 13, the variable length low data rate communication frame 300-302, is followed by a high data rate variable length communication frame including a high data rate (e.g. 9600 baud) multi-terminal poll at 311, a selected number of response slots S1, S2, ..., SN (where N would generally be a different number than M), covering a response time interval 312, and followed by a high data rate communication session with successfully responding mobile terminal units as indicated at 313.

Figure 14:
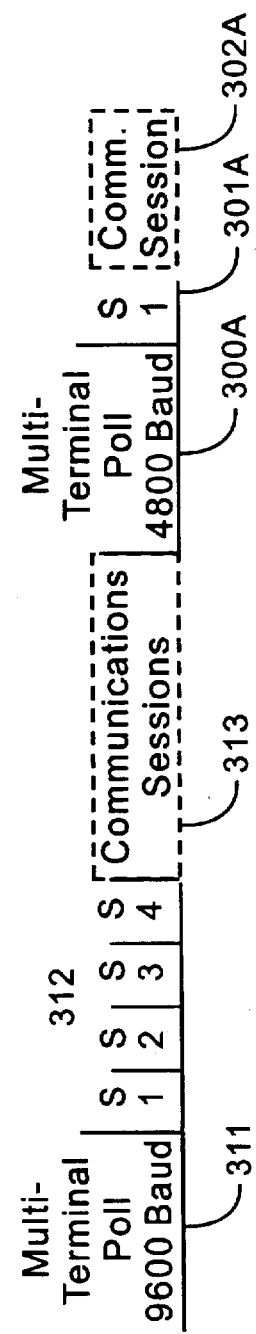

FIG. 14 illustrates a specific example in accordance with FIG. 13 where the low data rate and high data rate communication frames alternate, FIG. 14 showing four response slots following a high data rate multi-terminal poll interval 311 (N equals four), and one response slot following the low data rate multi-terminal poll at interval 300. In the embodiments of FIGS. 13 and 14, the base/controller station transmits multi-terminal polls alternately at the low and high data rates, and the individual mobile terminal units will selectively respond to the contention poll which provides the optimum data rate for the channel characteristics in their respective current locations. Such response will establish the data rate for the subsequent communication session between the base and a successfully responding mobile terminal unit.

The data rate determination can conceivably be made using any or all of the means described with reference to FIGS. 6 through 12. A simple approach is to (a) require the mobile terminal units to successfully decode the high data rate poll and (b) require the RSSI output to indicate a received signal level providing sufficient fade margin (e.g. twenty decibels higher than the high data rate sensitivity threshold of the terminal base) in order to use the high rate. The high data rate sensitivity threshold is taken with reference to the maximum acceptable bit error rate (BER) for the given application (e.g. a nominal 10(exp–6), i.e. ten to the minus six power, or one in one million, BER sensitivity at the high data rate), the RSSI threshold being selected so as to result in some small number of re-transmissions due to fading effects and other channel disturbances. As previously explained, the RSSI measurement is to be weighted so as to take account of the rapid fading effects which can be expected when the mobile transceiver units are in continuous or frequent motion at various distances from the base transceiver station. Such rapid fading effects are to be contrasted with slow fading effects which might be experienced between stationary transceivers in an office building due to the movement of people, mail carts, and the like. In a typical application of the present invention, the RF transceiver of a mobile unit may be secured with a bar-code scanner such as a deflected laser beam bar-code scanner or an instant CCD bar-code scanner. In such an example, the bar code data could be transmitted to the base station as the RF transceiver and a scanner device were being jointly transported by a vehicle (e.g. a forklift truck) to another site, or the RF transceiver and a scanner, e.g. as a unitary hand-held device, could be carried by the operator to another site as the bar code data was being transmitted to the base station. Because of the possible continuous or frequent movement of the mobile transceiver units within a factory or warehouse environment or in outdoor environments, the successful reception of a high data rate polling signal alone generally should not be relied upon in evaluating whether communication should be carried out at the high data rate. The probable feasibility of communication at the high data rate, (with the goal of higher data throughput in the system), must also take account of the possible motion of the mobile transceiver unit and the consequent possibility of fast fading (rapid fluctuations in signal level due to multipath effects) during the course of a message transmission (e.g. of collected bar code data). Thus, the purpose of using a signal quality indication, for example the RSSI measurement of component 270, FIG. 12, or the jitter characterization as represented at 271, FIG. 12, is to ascertain whether there is likely to be sufficient margin against fading (or other channel disturbance such as impulsive noise due to electrical machinery) during the course of the transmission.

By way of example, empirical data shows that twenty decibels of signal margin relative to the nominal 10 (exp–6) (ten to the minus six power, or one in one million) BER sensitivity threshold at the high data rate, provides protection against about ninety percent of the fades encountered in fringe areas in a typical industrial environment, while fifteen decibels of signal margin provides protection against seventy percent of such fades. Thus, for example, the RSSI threshold for determining whether to transmit at the high or low rate is established at some level above the minimum level at which reliable communication is usually possible at the higher data rate. If the threshold is set too high, a significant number of transmissions which could have been made at the high rate will be made at the low rate, reducing throughput. If the threshold is set too low, fading will result in a significant number of retransmissions, which will also reduce throughput. An optimum RSSI threshold at twenty decibels above the nominal 10–6 BER sensitivity at the high data rate will result in some small number of re-transmissions due to channel disturbances, but generally will provide an optimum data throughput for the overall system.

In the generalized case, the unit completing the handshake transmission (e.g. the unit making the response to a multi-terminal contention poll) makes the rate switching decision. In the embodiment of FIGS. 13 and 14, the rate switching decision is to be made by the mobile terminal unit. A decision in both the base station and the mobile transceiver unit might be desirable if the channel were not symmetric, for example if the base station had significantly higher power output than the mobile unit. The approach of having the mobile transceiver units equipped with sufficient intelligence to distribute to them the data rate switching rate decision, results in fewer transmissions required to dynamically adapt data rate in a rapidly changing propagation environment. The system as represented in FIGS. 13 and 14 in this respect is particularly adapted to the data collection environment wherein the mobile transceiver units may be in continuous or frequent motion with consequent rapid variations in signal strength, frequent operation in fringe conditions, and environmental extremes (e.g. of temperature as between a mobile unit and base station) degrading hardware performance.

In the simple example where data rate determination is based on the successful decoding of the high data rate poll and an adequate RSSI output evaluated to take account of rapid signal fading effects, the poll at 311 itself actually functions as a test pattern, and the occurrence of any bit errors in the decoding of the high data poll indicates the use of the low rate. The system of FIGS. 13 and 14 may make use of jitter characterization, e.g. based on the stability of recovered data clock during the received polling signal itself. As a fail-safe measure, excessive failures at accessing the base station through response to the multi-terminal poll, or errant message transmission attempts at the high data rate will result in the mobile terminals selecting the low data rate, with periodic retries at the higher rate, e.g. based on the various criteria described with respect to FIGS. 6 through 12.

Internal temperature information can be used in conjunction with a stored table containing typical oscillator frequency offsets as a function of temperature. The combination use of the fail-safe mode (good signal strength, but poor communications), and operation at a temperature where large oscillator frequent offsets can typically be expected, will dictate less frequent retry attempts until temperature measurements indicate that the frequency offset is most likely reduced.

The ability of the base station according to FIGS. 13 and 14 to independently adjust the number of slots for the low data rate frames and for the high-data-rate frames according to the recent traffic at the respective data rate, preserves the throughput advantage of dual or multiple data rate operation by minimizing system overhead. Adding to this efficiency, the dormant protocol features may also be incorporated so as to provide an even faster response in conditions of very low traffic.

The example of FIG. 14 where four slots are allocated to high data rate communication (e.g. 9600 baud), and one slot is allocated to low data rate communication (e.g. 4800 baud) may result where the majority of traffic had been occurring at the higher data rate, with perhaps only occasional transmissions at the lower rate.

Figure 15:
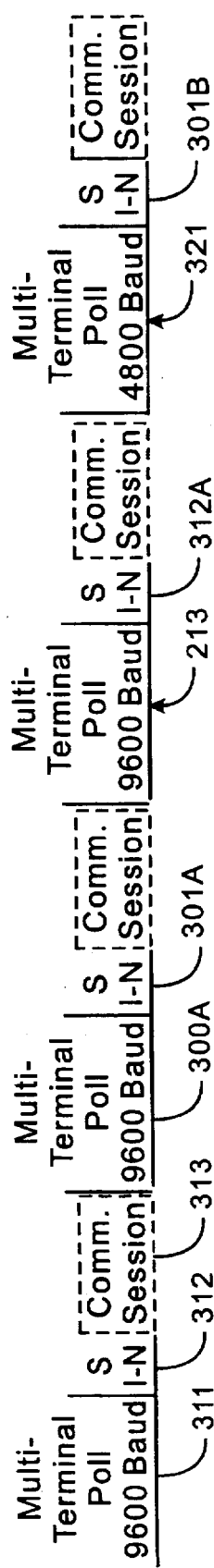

FIG. 15 shows switching alternately between the high and low data rate frames, with the values of N and M varying in accordance with the numbers of responses to the respective high data rate and low data rate polls. For example, if a number of full slots and collisions between responding mobile stations occurs with a value of N of four as in FIG. 14, a succeeding high data rate frame such as indicated at 320 in FIG. 15 may take place with an increased number of slots, e.g. five slots (N equals five) or more at 312-A, FIG. 15. Similarly if collisions occurred at the single slot at interval 301A in response to the low data rate poll, then the number of slots at a subsequent communication frame 321 might be increased to two (M equals two) or more during the response interval 301B, FIG. 15.

Figure 16:
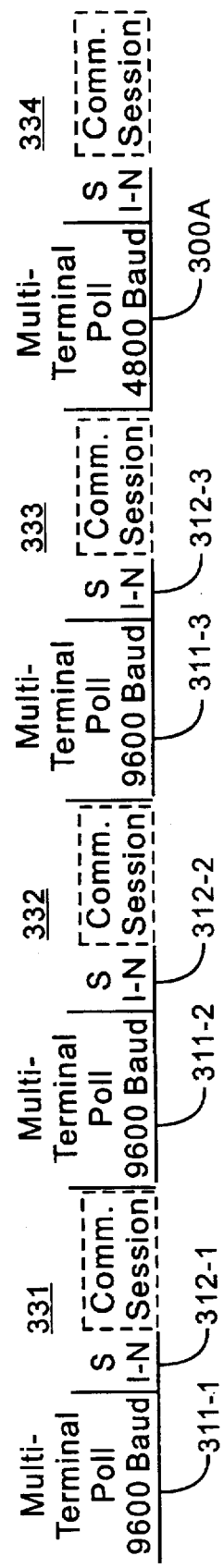

FIG. 16 shows a different switching implementation which more heavily favors one rate (in this case a high data rate of 9600 baud) or the other. This could be the case when no active terminals are communicating at one of the two rates, and only periodic transmissions at the unused rate are necessary to provide access for terminals which might have been out of range of the base or powered off. Thus in FIG. 16, three successive high data rate communication frames 331, 332, 333, alternate with a single low-data-rate communication frame 334. As before, the successive multi-terminal contention polls may be at a data rate of 9600 baud as indicated at 311-1, 311-2 and 311-3, and the number of response slots at 312-1, 312-2 and 312-3 may be varied in successive frames and in successive cycles of high data rate and low data frames to dynamically adapt the system to the instantaneous loading conditions at the respective data rates.

Figure 17:
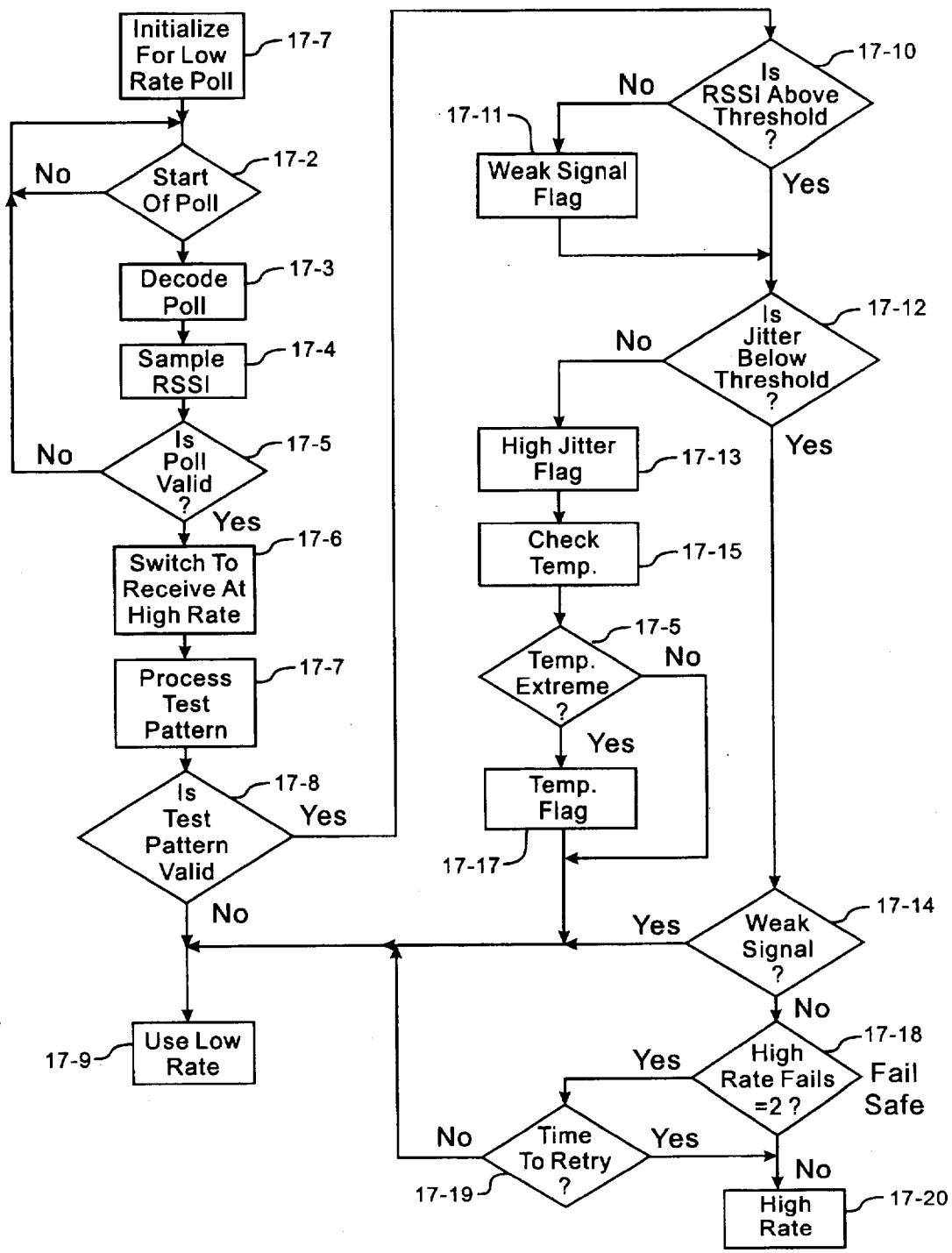
FIG. 17 is a flow diagram giving steps which are particularly applicable to the embodiment of FIG. 11, but which are also generally applicable with modifications to various of the other embodiments.

Description of FIG. 17

For each of the preceding embodiments, operation may be carried out at the mobile transceiver units generally as represented in FIG. 17. In this sequence of operation, the base station issues a poll at the lower data rate which is followed by a test pattern at the higher data rate. For FIGS. 13–16, the high data rate contention poll at 311 or 311-1 constitute the test signal.

The mobile transceiver units initialize for reception of the low data rate poll as indicated at 17-1 and wait for the start of the poll as indicated at 17-2. When the poll is received, it is decoded as indicated at 17-3 and the RSSI reading is sampled as indicated in 17-4. If the evaluation of the poll as indicated at 17-5 is favorable, the mobile unit switches to receive a test pattern at the high data rate as indicated at 17-6 and processes the high data rate test pattern as indicated at 17-7.

Referring to the embodiment of FIGS. 13–16, each time the multiple rate mobile units are reset by the base, the mobile transceivers may be placed in low date rate receiving condition, whereupon the base station sends a low data rate poll e.g. at 300, FIG. 13. When a valid low data rate poll with characteristics (e.g. sampled and properly weighted signal strength) favorable to the use of the high data rate for the transmission of collected data, has been received by a given multiple rate mobile unit, the transceiver of such mobile unit is switched to receive a high rate contention poll signal as at 311, FIGS. 13, 14 and 15, or as at 311-1, FIG. 16. The steps following step 17-7 in FIG. 17 would then involve evaluation of such high data rate contention poll for validity and evaluation of the characteristics of the received high data rate contention poll (e.g. with respect to received signal strength and/or jitter as described with reference to FIGS. 13–16).

If the decision concerning the test pattern (e.g. as represented at 210, FIG. 11) or concerning the high data rate contention poll of FIGS. 13–16, as represented by block 17-8 in FIG. 17, is negative, then the mobile transceiver unit may respond selecting the low data rate for transmission of its data (as with mobile unit #0 in FIG. 11) or the mobile transceiver unit may await a low data rate poll (as at 300A, FIGS. 14, 15 and 16).

Where a mobile unit selects a low date rate and successfully responds, a specific poll addressed to the mobile unit will then be at the low data rate as represented by "poll #0" in FIG. 11, and the data then transmitted to the base will be sent at the low data rate as shown in FIG. 11, and as represented by block 17-9, FIG. 17.

If the decision at 17-8 favors the high data rate, then the weighted evaluation of the RSSI samples may take place as indicated at 17-10, a flag being set as indicated at 17-11 where the evaluation indicates marginal transmission conditions.

At 17-12, jitter is evaluated and for the case of excessive jitter, a high jitter flag is set as indicated at 17-13. Where jitter is acceptable, but the weak signal flag is set, the decision at 17-14 leads to use of the low data rate as indicated at 17-9.

For the case of high jitter at 17-13, the temperature values are checked as indicated at 17-15 and a temperature decision is made at 17-16. For example, if the mobile unit is at an extreme temperature this may result in a setting of a temperature flag as indicated at 17-17. On the other hand, the base station may transmit its temperature condition to the mobile units so that the mobile units can determine the actual temperature differential between the respective mobile unit and the base station and set the flag at 17-17 accordingly. In any event, the high jitter condition results in a return to the low data rate as indicated at 17-9.

Where jitter is below a threshold and signal strength is adequate, the mobile unit may evaluate whether there has been a high rate of failures, and for example if there have been a given number of such failures (e.g. two or two out of three attempts), then control may pass to a decision block 17-19 which may normally determine for the low rate unless under the present circumstances of temperature or elapsed time or the like it is determined that it is time to retry at the high rate. The decision block 17-18 together with the block 17-19 then safe guards against a circumstance where the mobile unit might otherwise continue to try the high data rate in spite of repeated failures. The retry criteria may be as previously described with respect to FIGS. 6 through 12. If the decision is to attempt response at the high rate as indicated at 17-20, the mobile unit may respond in a randomly selected time slot with a response (e.g. at the low data rate) signifying that further communication is to take place during individual polling of the identified mobile unit at the high data rate for example as represented with respect to mobile unit number two in FIG. 11.

For the embodiments of FIGS. 13–16, where the high data rate contention poll (e.g. at 311) is treated as a high data rate test signal for processing as at 17-7 in FIG. 17, the decision process at 17-8 et seq. in FIG. 17 may proceed concurrently with the random selection of a response slot and switching to high data rate transmit mode, so that if the mobile unit is to respond to the high data rate contention poll, such response can take place at any of slots S1, S2, S3, or S4, for example, during interval 312, FIG. 14. Of course, for the case where the switching to the high data transmit mode is only made at 17-20, the interval between the contention poll and the first response slot will provide for maximum processing time and the required switching time.

With respect to decision block 17-19, as a simple example, in the fail-safe condition, the mobile unit might continue to respond at the lower rate for some number of polls (such as five) before attempting to try the high rate response procedure at 17-20.

The flags for different failure mechanisms are only included in the example of FIG. 17 so that some history can be maintained for use in making retry decisions (if a more complex retry algorithm is desired). The flags can be omitted, in which case the "No" output of the RSSI threshold decision block 17-10 can go directly to the low-rate block 17-9 and the decision block 17-14 and the temperature processing blocks 17-15, 17-16 and 17-17 can be omitted since they are superfluous if jitter is acceptable. The "No" output of block 17-12 would lead to low data rate block 17-9 where the flags are omitted.

Many modification and variations will be apparent from the foregoing disclosure. For example, the base station could have provision for parallel baseband processing of received and demodulated signals, e.g. the demodulated signal being supplied in parallel to a 4800-baud analog processor and to a 9600-baud analog processor. The baseband digital processing section would include a 4800-baud receive buffer and a 9600-baud receive buffer so that the base station could receive a signal at either 4800 baud or 9600 baud whenever the base station was in receive mode. Then for the embodiment of FIGS. 11 and 17, for example, the various mobile units with data messages to send could all send the same type of response signal (i.e. their respective addresses but without specifying a data-rate selection) in randomly selected time slots pursuant to an affirmative decision at 17-5. The further steps of FIG. 17 would then determine whether to respond to a specific poll addressed to the respective mobile unit, using a high data rate or a low data rate for the transmission e.g. of collected scanner data. Such specifically addressed polls of individual mobile units could all be sent by the base station at the low data rate. If a given mobile unit sent its data message at the high data rate, the base high data rate receive buffer would automatically receive the data and transfer it for processing. The base station would not need to be informed in advance of the data rate decision made by the mobile unit e.g. pursuant to FIG. 17.

Many other and further modifications and variations may be made without departing from the broader teachings and concepts of the present invention.

Supplemental Discussion

For a protocol such as the one shown in FIG. 5, a contention polling message is transmitted having a fifteen millisecond header, a start of message block, a code identifying the message as a multi-terminal poll, a block specifying the number of time slots which may be selected for response, a block identifying the addresses of mobile units for which the base station has a message, a cyclic redundancy-check character, and an end of message character. The same format may be used for a high data-rate contention poll, the header then containing seventy-five bits at a data rate of 9600 baud (instead of 37.5 bits at 4800 baud).

In a base initiated reset, the base station would transmit a low data rate reset message and would allocate a large number of response slots to allow responses by all mobile units. The base station could send a low data rate contention poll with a large number of response slots several times in succession, and the mobile units could randomly determine which contention poll to respond to, as well as randomly determining which of the large number of time slots to respond in.

If, for example, after a base initiated reset, a multiple data-rate mobile unit had scanner data to transmit, such mobile unit could await a test signal, e.g. as at 311, FIGS. 13, 14, or 15, or 311-1, FIG. 16. If a determination was made that high data rate transmission of the collected data should be attempted, the mobile unit could proceed as described here for the respective embodiments of FIGS. 13–16. Once having selected high data rate operation, a mobile unit could continue to monitor high data rate contention polls for the examples of FIGS. 13–16. Thus if the base station dynamically varied the proportion of high data rate and low data rate polls as in the embodiment of FIG. 16, it would not be necessary to advise the mobile units of the changes in the pattern. The mobile units could be programmed to switch to low data rate operation whenever a failure of communication occurred at the high data rate, but otherwise to remain in high data-rate mode e.g. for a suitable time, e.g. five seconds. By switching to the low data-rate mode after five seconds, the mobile unit would be assured of being notified of a pending message from the base station even if the base station was supplying high data rate contention polls very infrequently or not at all because of very light traffic at a high data rate. A mobile unit could be programmed to send its data message at the low data rate, e.g. if it waited for a specified time such as five seconds, and failed to receive a high data rate contention poll within such specified time interval.

Example of the Dynamic Selection of Number of Response Slots

For the case of contention polling as in the various embodiments including FIG. 5 herein, the base station may dynamically vary the number of response time slots (such as 41–44, FIG. 5) according to traffic at a fixed data rate, or may dynamically vary the respective numbers of slots associated with respective different data rate contention polls (e.g. as in FIGS. 13–16).

For each data rate, a number of response slots for each contention poll may be set in order to force the ratio between the number of empty response slots (wherein no mobile unit responses are received) and all other slots (ones with successful responses or collisions) to tend toward eighty percent.

If the ratio computed for twenty successive slots is between sixty percent and seventy percent, then the base controller would add one additional slot (e.g. a fifth slot in FIG. 5) for the next transmission of the contention poll.

If the ratio computed for ten successive slots is less than sixty percent, then the controller would add two additional slots (e.g. fifth and sixth slots in FIG. 5) so that the next contention poll from the base would specify the previous number of slots increased by two (e.g. six slots in FIG. 5).

If the ratio computed for thirty successive slots was over ninety percent, the base controller would reduce the number of slots by one (e.g. to three in FIG. 5).

Finally, if no empty slots were observed over seven successive slots (ratio equals zero), the base controller could switch to a serial poll protocol where each mobile unit is polled in sequence, or for the example of FIG. 16, if feasible, change the proportion of low data rate and high data rate polling communication frames.

The foregoing example demonstrates several advantages of dynamic adaptive control of number of response slots, or more generally of response time intervals following a contention poll. First, when little traffic is present, few response slots are allocated. This reduces to a minimum the amount of system overhead required and therefore the response time is kept to a minimum for mobile terminals needing the channel. Second, the rate at which slots are added and removed can be tailored to handle burst traffic loading without causing the system to overload. Third, the protocol can be changed, if required, to support high system loading. Additionally, dormant polling protocol features may be added which optimize the response time during very low system loading.

The method and apparatus of the present invention is of particular utility when applied to a spread spectrum radio broadcast system, especially one that includes frequency hopping. A spread spectrum broadcasting system uses a sequential pseudo-noise signal to spread a signal that is in a relatively narrow band over a wider range of frequencies. It is the subject of standards issued by the Federal Communications Commission (FCC) that provide usable spectrum at low power levels for communication in limited areas such as warehouses, office buildings, and the like. The use of spreadspectrum techniques minimizes interference with others using the same channels in the spectrum.

Frequency hopping is the switching of transmitted frequencies according to a sequence that is fixed or pseudo-random and that is available to the sending and receiving stations. The combination of frequency hopping with spread spectrum increases the need for some form of error detection or correction. This may be accomplished either by error-correction codes or by repeated transmission of messages.

It will be apparent that many further modifications and variations may be effected without departing from the scope of the teachings and concepts of the present invention.

What is claimed is:

1. In a radio frequency data communication network having a base station and a plurality of computing devices that comprises a plurality of roaming transceivers that are battery powered, wherein the base station supports communication among the plurality of computing devices within a premises, a method comprising:

evaluating, by the base station, current communication channel conditions;

dynamically selecting, by the base station, either a polling protocol or a carrier sense protocol based on the evaluation; and dynamically selecting, by the plurality of roaming transceivers, the carrier sense protocol after determining through monitoring the communication channel that the polling protocol is not in use.

2. The method of claim 1 further comprising adjusting, by the base station, parameters of the polling protocol based on current communication channel conditions when the polling protocol is selected.

3. The method of claim 2 wherein the parameters comprise a polling rate.

4. The method of claim 1 wherein the dynamic selection by the base station comprises a use of hysteresis to manage the dynamic selection.

5. In a radio frequency data communication network located within a premises and having a base station and a plurality of roaming transceivers that are battery powered, a method comprising:

evaluating, by the base station, current communication channel conditions;

depending on the evaluation, dynamically, by the base station, either selecting a polling protocol for managing communication with the plurality of roaming transceivers or selecting a protocol which relinquishes control of communication to the plurality of roaming transceivers;

listening on the communication channel, by the plurality of roaming transceivers, to dynamically identify which protocol is currently selected; and communicating, by the plurality of roaming transceivers, utilizing the selected protocol.

6. The method of claim 5 further comprising adjusting, by the base station, parameters of the polling protocol based on current communication channel conditions when the polling protocol is selected.

7. The method of claim 6 wherein the parameters comprise a polling rate.

8. The method of claim 5 wherein the dynamic selection by the base station comprises a use of hysteresis to manage the dynamic selection.

9. In a radio frequency data communication network located within a premises and having a base station and a plurality of roaming transceivers that are battery powered, a method comprising:

dynamically selecting, by the base station, either a first protocol that requires periodic transmissions by the base station to managing communication among the plurality of roaming transceivers, or a second protocol that does not require periodic transmissions by the base station to permit management of communication by the plurality of roaming transceivers; and dynamically selecting, by the plurality of roaming transceivers, the second protocol after failing to identify periodic transmissions by the base station.

10. The method of claim 9 wherein the first protocol comprises a polling protocol.

11. The method of claim 9 wherein the second protocol comprises sensing that the channel is clear before one of the plurality of roaming transceivers attempts to transmit.

12. The method of claim 10 further comprising adjusting, by the base station, parameters of the first protocol based on prior communication characteristics when the first protocol is selected.

13. The method of claim 12 wherein the parameters comprise a polling rate.

14. The method of claim 9 wherein the dynamic selection by the base station comprises a use of hysteresis to manage the dynamic selection.

* * * * *